(12) United States Patent
Phua et al.

(10) Patent No.: US 11,981,818 B2
(45) Date of Patent: May 14, 2024

(54) METHOD FOR OBTAINING MELANIN FROM INVERTEBRATE BIOMASS AND THE PRODUCT OBTAINED THEREFROM

(71) Applicant: INSECTTA PTE. LTD., Singapore (SG)

(72) Inventors: Jun Wei Phua, Singapore (SG); Christoph Johann Heinrich Ottenheim, Singapore (SG)

(73) Assignee: INSECTTA PTE. LTD., Singapore (SG)

( * ) Notice: Subject to any disclaimer, the term of this patent is extended or adjusted under 35 U.S.C. 154(b) by 116 days.

(21) Appl. No.: 17/910,351

(22) PCT Filed: Mar. 12, 2021

(86) PCT No.: PCT/SG2021/050130
§ 371 (c)(1),
(2) Date: Sep. 9, 2022

(87) PCT Pub. No.: WO2021/183058
PCT Pub. Date: Sep. 16, 2021

(65) Prior Publication Data
US 2023/0127563 A1    Apr. 27, 2023

(30) Foreign Application Priority Data
Mar. 12, 2020   (SG) .............................. 10202002311X

(51) Int. Cl.
*C09B 61/00* (2006.01)

(52) U.S. Cl.
CPC .................................... *C09B 61/00* (2013.01)

(58) Field of Classification Search
CPC ....................................................... C09B 61/00
USPC .............................................................. 8/438
See application file for complete search history.

(56) References Cited

FOREIGN PATENT DOCUMENTS

| CN | 103497535 A | 1/2014 |
| CN | 107019708 A | 8/2017 |

OTHER PUBLICATIONS

Ukrainian Journal of Ecology Oct. 31, 2017.*
Ushakova N. A. et al., Melanin properties at the different stages towards life cycle of the fly *Hermetia illucens*. Ukrainian Journal of Ecology, Dec. 31, 2017, vol. 7, No. 4, pp. 424-431 [Retrieved on Jun. 15, 2021] <DOI: 10.15421/2017_137> p. 425 and Table 1.

(Continued)

*Primary Examiner* — Eisa B Elhilo
(74) *Attorney, Agent, or Firm* — SOROKER AGMON NORDMAN PTE LTD

(57) ABSTRACT

The present disclosure provides a method for obtaining melanin from invertebrate biomass. The method may comprise rupturing the invertebrate biomass to form raw material; demineralizing the raw material to form a first solid fraction; deproteinating the first solid fraction to form a second solid fraction; liberating a melanin from the second solid fraction resulting in a supernatant comprising the melanin; extracting the supernatant; and precipitating the melanin. The present disclosure further provides a purified melanin obtained from invertebrate biomass.

20 Claims, 13 Drawing Sheets

(56) References Cited

OTHER PUBLICATIONS

Ushakova N. et al., Antioxidative Properties of Melanins and Ommochromes from Black Soldier Fly *Hermetia illucens*. Biomolecules, Aug. 23, 2019, vol. 9, No. 408, pp. 1-12 [Retrieved on Jun. 15, 2021] <DOI: 10.3390/BIOM9090408> p. 2.

Philibert T. et al., Current Status and New Perspectives on Chitin and Chitosan as Functional Biopolymers. Appl Biochem Biotechnol, Oct. 27, 2016, vol. 181, No. 4, pp. 1314-1337 [Retrieved on Jun. 15, 2021] <DOI: 10.1007/S12010-016-2286-2> p. 1323 and Figure 1.

Caruso D. et al., Chapter 9: Economic Aspects of Production, In: Caruso D. et al., 2013, Technical Handbook of Domestication and Production of Diptera Black Soldier Fly (BSF) *Hermetia illucens*, Stratiomyidae; IRD-DKP, 141 pages. Dec. 31, 2013 [Retrieved on Jun. 15, 2021 from https://horizon.documentation.ird.fr/exldoc/pleins_textes/divers17-11/010063336.pdf] p. 103.

Pralea I-E et al., From Extraction to Advanced Analytical Methods: The Challenges of Melanin Analysis. Int J Mol Sci, Aug. 13, 2019, vol. 20, No. 16(3943, pp. 1-37 [Retrieved on Jun. 15, 2021] <DOI: 10.3390/IJMS20163943> p. 3 and Table 1.

Khayrova A. et al., Obtaining Chitin/Chitosan-Melanin Complexes from Black Soldier Fly *Hermetia illucens*. IOP Conf Ser Mater Sci Eng, Jun. 12, 2020, vol. 809, pp. 1-7 [Retrieved on Jun. 15, 2021] <DOI: 10.1088/1757-899X/809/1/012020> p. 2.

\* cited by examiner

METHOD FOR OBTAINING MELANIN FROM INVERTEBRATE BIOMASS AND THE PRODUCT OBTAINED THEREFROM

TECHNICAL FIELD

The current disclosure relates to the obtaining of melanin from invertebrate biomass and in particular the invention relates to a method for obtaining melanin by means of demineralization and deproteination of invertebrate biomass and the product obtained therefrom.

BACKGROUND

Melanin is a broad term for a group of pigments found in many organisms. Melanin serves several functions. Melanin most often serves the function of photoprotection as it is capable of converting UV radiation into heat. Melanin has been shown to protect against reactive oxygen species, high temperature and chemical stress in microorganisms. In addition, as melanin has been shown to help bacteria in its survival against the immune system of a host organism, it has been evaluated as a virulence and pathogenicity factor. In radiotropic fungi, melanin is suspected to be used for harvesting gamma rays in a similar way chlorophyll is used in plants for harvesting sunlight to produce energy. Melanin is found in the immune system of invertebrates and in cephalopod ink used for defence. In insect cuticles and plants, it acts as an important structural element.

Melanin is produced in a process called melanogenesis. Three main types of melanin are known, namely, melanin (brown/black), phaeomelanin (yellow/red) and allomelanin (catechol melanin) with melanin being the most common variant. Melanin is very heterogeneous and is often found as a mixture of multiple melanin types. Thus, the exact structure of melanin and each melanin type remains unclear.

Melanin may either be synthesized or isolated from natural sources. Isolation of melanin from natural sources is preferred as melanin synthesis is expensive due to the costly reagents used. However, isolation of melanin from natural sources has its own problems as melanin is not easily separated from proteins and lipids which are always present in natural sources.

A natural melanin source is the ink sacs from cephalopods, which contain around 1 g melanin each, with around 15% of the ink (wet weight) consisting of melanin. However, the supply of cephalopod ink sacs for melanin isolation is severely limited and is therefore not a reliable commercial source of melanin.

Another natural melanin source is fungi. There are several publications available that detail the process of obtaining melanin from fungi. International Patent Application Publication No. WO 2010/064262 describes a process for obtaining melanin from the fungus *Gliocephalotrichum*. The fungus is grown in liquid culture such that the fungus releases melanin into the culture liquid. After the fungal biomass is removed from the culture liquid containing the melanin, the pH of the media is acidified with hydrochloric acid (HCl) and the melanin precipitate is recovered by centrifugation or filtration. The precipitate is then dried and re-dissolved at pH 11 or higher, dialyzed, and precipitated.

Russian Patent No. RU2565178 describes the obtaining of melanin from fungal spores. Mushroom fruiting bodies are colonized with mushroom eating beetles for 20 to 30 days. The resulting mass is treated with ethyl alcohol for 5 hours, separated by centrifugation, and boiled with water for 2 hours. After centrifugation, the precipitate is extracted with 0.5 M sodium hydroxide (NaOH) solution for 24 hours at 25° C. to 28° C. After further precipitation with HCl, the precipitate is dissolved with 0.1 M NaOH and reprecipitated three times and subsequently dialyzed.

Chinese Patent Application Publication No. CN104382953 describes the obtaining of melanin from the black fungus *Auricularia*. Biomass is pulverized and treated with 1.5 mol/L NaOH under sonication to obtain a melanin solution. In the subsequent precipitation step, the pH is adjusted to 1.5 and stored at 80° C. for 6 hours to 12 hours. After centrifugation, the precipitate is dried or lyophilized and the melanin powder is refined by hydrolysis with 1 mil/L HCl for 2 hours at 100° C., filtered, extracted with an organic solvent, and precipitated.

Insects are also a natural melanin source. Chinese Patent No. CN103497535 describes a process for the obtaining of melanin from animals with a focus on insects, where the raw material is crushed, extracted with an alkaline solution at 70° C. to 100° C., followed by an acid treatment and an extraction of melanin via an organic solvent.

Ushakova et al., *Ukrainian Journal of Ecology*, 7(4), 424-431 (2017) used a process for extraction of melanin from *Hermetia illucens*, also known as the black soldier fly. Insect biomass was ground and added to 10% NaOH solution. The mixture was stirred at 80° C. without air for 1.5 hours. Subsequently, 50% NaOH solution was added, and the resulting mixture was stirred for 2 hours at 95° C. Melanin was recovered by precipitation through adjusting the pH of the mixture to 2 with concentrated HCl. The precipitate was recovered by centrifugation, then neutralized and dried.

Ushakova et al., *Doklady Biochemistry and Biophysics*, 473(1), 102-105 (2017) obtained melanin from *Hermetia illucens* by extraction with 3 M to 5 M potassium hydroxide solution, followed by precipitation with concentrated HCl at a pH of 2. After centrifugation, the melanin pellet was treated with 1% HCl for 3 to 4 hours, centrifugated, washed with distilled water and dried in a desiccator.

The processes described above fail to sufficiently separate proteins, minerals, and chitin from melanin so as to obtain sufficiently pure melanin, or even melanin at high quantities. An example of melanin obtained from a previous method that utilized black soldier flies had a yield of 4%, and a purity level of 57%. NaOH is typically used to solubilize and remove proteins. However, harsh treatment or reaction conditions involving high concentrations of NaOH, prolonged heating, and high temperatures, will also result in the concurrent degradation and solubilization of melanin. As protein and melanin are both released and dissolved into the alkaline solvent in a single step, purification of the melanin is a costly process. Furthermore, some of these processes, especially those that use fungi, are also expensive to run and thus makes the obtaining of melanin commercially not viable.

SUMMARY

There is provided according to an exemplary embodiment of the disclosure, a method of obtaining melanin from an invertebrate biomass, the method comprising: rupturing the invertebrate biomass to form a raw material; demineralizing the raw material to form a first solid fraction; deproteinating the first solid fraction to form a second solid fraction; liberating a melanin from the second solid fraction resulting in a supernatant comprising the melanin; extracting the supernatant; and precipitating the melanin. Optionally, the invertebrate biomass is a melanised Arthropoda phylum species. Optionally, the invertebrate biomass is *Hermetia illucens*. Optionally, the invertebrate biomass is an adult form of *Tenebrio molitor*. Optionally, the invertebrate biomass comprises cuticles from prepupal stages, empty pupae shells or spent adult stage.

In an exemplary embodiment of the disclosure, the demineralizing comprises adding a first acidic solution to the raw material to obtain a first mixture. Optionally, the method further comprises treating the first mixture for a first period of time at a first temperature between 25° C. and 90° C.; and extracting the first solid fraction from the first mixture by filtration or centrifugation. Optionally, the first acidic solution is hydrochloric acid having a concentration of between 0.1 M and 3 M. Optionally, the first acidic solution is lactic acid having a concentration of between 1% and 10% w/w. Optionally, adding the first acidic solution is performed to obtain a first solid-to-liquid ratio of between 1:10 and 1:100. Optionally, the first period of time is between 1 hour and 24 hours.

In an exemplary embodiment of the disclosure, the method further comprises washing the first solid fraction with water and receiving a first washing liquid, checking the first washing liquid for pH level, and rewashing the first solid fraction with water until the first washing liquid pH level is between 5 and 7.

In an exemplary embodiment of the disclosure, the deproteinating comprises adding a first alkaline solution having a concentration between 0.5 M and 3 M to the first solid fraction to obtain a second mixture. Optionally, the first alkaline solution is sodium hydroxide. Optionally, adding the first alkaline solution is performed to obtain a second solid-to-liquid ratio of between 1:10 and 1:30.

In an exemplary embodiment of the disclosure, the method further comprises treating the second mixture for a second period of time at a second temperature between 25° C. and 90° C.; and extracting the second solid fraction from the second mixture by filtration or centrifugation. Optionally, the second period of time is between 30 minutes and 5 hours.

In an exemplary embodiment of the disclosure, the method further comprises the step of washing the second solid fraction with water and receiving a second washing liquid, checking the second washing liquid for pH level, and rewashing the second solid fraction with water until the second washing liquid pH level is between 7 to 9.

In an exemplary embodiment of the disclosure, the melanin liberating comprises adding a second alkaline solution having a concentration of between 1 M and 6 M to the second solid fraction to obtain a third mixture; and treating the third mixture for a third period of time at a third temperature between 70° C. and 90° C. Optionally, the second alkaline solution is sodium hydroxide. Optionally, adding the second alkaline solution is performed to obtain a third solid-to-liquid ratio of between 1:10 and 1:24. Optionally, the third period of time is between 1 hour and 6 hours.

There is further provided according to an exemplary embodiment of a disclosure, a composition obtainable by a method described above.

There is further provided according to an exemplary embodiment of a disclosure, a purified melanin obtainable by a process comprising the steps of: providing invertebrate biomass; rupturing the invertebrate biomass to form a raw material; demineralizing the raw material to form a first solid fraction; deproteinating the first solid fraction to form a second solid fraction; liberating melanin from the second solid fraction resulting in a supernatant comprising the melanin; extracting the supernatant; and precipitating the melanin. Optionally, the invertebrate biomass is a melanised Arthropoda phylum species. Optionally, the invertebrate biomass is *Hermetia illucens*. Optionally, the invertebrate biomass is an adult form of *Tenebrio molitor*. Optionally, the invertebrate biomass comprises cuticles from prepupal stages, empty pupae shells or spent adult stage.

BRIEF DESCRIPTION OF THE DRAWINGS

In order for the present disclosure, to be better understood and for its practical applications to be appreciated, the following Figures are provided and referenced hereafter. It should be noted that the Figures are given as examples only and in no way limit the scope of the invention.

DETAILED DESCRIPTION

Figure 1:
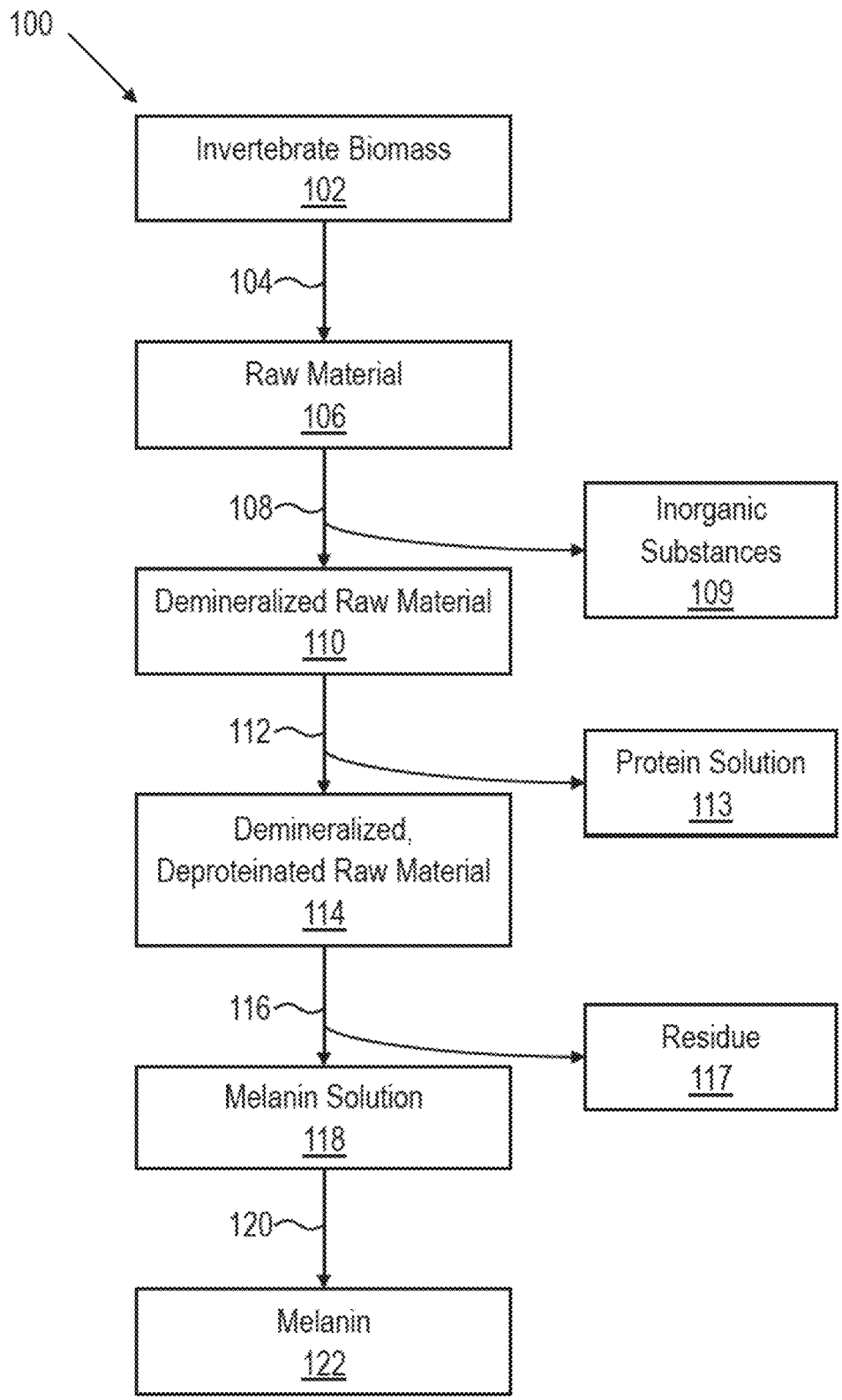
FIG. 1 depicts a process of a melanin obtaining process, in accordance with embodiments of the present disclosure.

In the following detailed description, numerous specific details are set forth in order to provide a thorough understanding of the invention. However, it will be understood by those of ordinary skill in the art that the invention may be practiced without these specific details. In other instances, well-known methods, procedures, components, modules, units and/or circuits have not been described in detail so as not to obscure the invention.

Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. Unless explicitly stated, the method embodiments described herein are not constrained to a particular order or sequence. Additionally, some of the described method embodiments or elements thereof can occur or be performed simultaneously, at the same point in time, or concurrently. Unless otherwise indicated, use of the conjunction "or" as used herein is to be understood as inclusive (any or all of the stated options).

With specific reference now to the drawings in detail, it is stressed that the particulars shown are by way of example and for purposes of illustrative discussion of embodiments of the disclosure. In this regard, the description taken with the drawings makes apparent to those skilled in the art how embodiments of the disclosure may be practiced.

The present disclosure provides for mechanically opening macroscopic entrapments from insects filled with contaminants to maximize surface accessibility, demineralizing with hydrochloric acid (HCl) to loosen the structure and to remove minerals, and treating the mixture with a first weak alkaline solution to remove protein while retaining a maximum of melanin. A subsequent, harsher treatment with a second alkaline solution is then applied, the second alkaline solution being concentrated and strong enough to liberate most of the melanin with much less protein contamination than other methods. In the present disclosure, the single alkaline treatment step in prior solutions involving invertebrates has been optimized such that maximal proteins are removed but minimal melanin is degraded and solubilized. Thus, melanin can be produced in larger amounts and in higher purity compared with prior solutions. In addition, by avoiding extreme, highly concentrated alkaline solutions in the initial alkaline treatment, the costs for subsequent melanin recovery and purification are minimized.

The present disclosure relates to the extraction of melanin by: (a) rupturing invertebrate biomass for sufficient exposure to solvents and solutions; (b) demineralization of the ruptured invertebrate biomass with an acid solution for removal of minerals; (c) deproteination with a first alkaline solution under mild treatment conditions for the removal of proteins while preventing melanin from leaching out; (d) melanin liberation with a second alkaline solution under harsher conditions; (e) precipitation of melanin; and (f) harvesting of melanin followed by subsequent washing and drying.

For the avoidance of doubt, and unless specified to the contrary, any concentrations discussed and disclosed in the present disclosure refer to the final concentration of any solution or mixture (e.g., the final concentration of a solution or mixture after an acid or alkaline solution is added).

For the avoidance of doubt, and unless specified to the contrary, any treatment durations discussed and disclosed in the present disclosure refer to the duration between the time when the desired temperature was reached until the end of the treatment.

FIG. 1 depicts a process 100 of a melanin extraction process, in accordance with embodiments of the present disclosure. Invertebrate biomass is ruptured, demineralized with acid to remove inorganic substances, deproteinated under relatively mild alkaline conditions to remove the protein fraction before the melanin is liberated in a hot alkaline treatment. Subsequently, the melanin is recovered by precipitation.

Invertebrate biomass 102 and therefore the raw material of the process can be obtained from any melanized species. Preferably, the melanized species belongs to the phylum Arthropoda and more preferably from *Hermetia illucens* (*Insecta:Diptera*:Stratiomyidae), whose common name is the Black Soldier Fly. Other example of the melanized species is the adult beetle form of *Tenebrio molitor*, whose common name is the yellow mealworm. Preferably, the invertebrate biomass consists of the cuticles of the prepupal stages, empty pupae shells or spent adult stage, but it may be derived from any life stage of the melanized species as long as such life stage comprises melanin.

In order to sufficiently expose remnant proteins and lipids to later treatments such as solvents and solubilization reagents, in step 104 the invertebrate biomass 102 is ruptured by subjecting the invertebrate biomass 102 to squashing, grinding, perforation, or any other mechanical means to rupture the exoskeletons of the invertebrate biomass 102. Preferably, the torn pieces of exoskeleton from any source remain as large as possible (>5 mm) to facilitate separation of supernatant and filtrate in later steps. The invertebrate biomass 102 prepared in such manner for the extraction and purification steps is subsequently termed "raw material" 106.

In step 108, demineralization of raw material 106 is carried out by adding a first acidic solution to the raw material 106 to obtain a first mixture with a first solid-to-liquid ratio. The first mixture is treated for a first period of time with a first temperature. Acid treatment of melanin-containing biomass is essential for the removal of minerals such as calcium, which would otherwise be a contaminant. Removal of calcium also disrupts the chitinous matrix of biomass, allowing for successful deproteination in a subsequent step, even under mild conditions. The first acidic solution may be any acid, including hydrochloric acid and lactic acid. The person skilled in the art would appreciate that the first solid-to-liquid ratio, the first period of time and the first temperature depend on the type and concentration of first acidic solution used and may be adjusted accordingly depending on the type and concentration of first acidic solution.

In some embodiments, the first acidic solution may be a hydrochloric acid having a concentration of between 0.1 M and 3 M. If the first acidic solution is hydrochloric acid, the first solid-to-liquid ratio may be between 1:10 and 1:100, the first period of time may be between 1 hour and 24 hours, and the first temperature may be between 25° C. and 90° C. For example, if the first acidic solution is hydrochloric acid having a concentration of 0.1 M, the first time solid-to-liquid ratio may be 1:100, the first period of time may be 3 hours, and the first temperature may be 30° C. If the first acidic solution is hydrochloric acid having a concentration of 0.5 M, the first solid-to-liquid ratio may be 1:10, the first period of time may be 1 hour, and the first temperature may be between 50° C. and 90° C. If the first acidic solution is hydrochloric acid having a concentration of between 1 M and 3 M, the first solid-to-liquid ratio may be 1:10 and the first period of time may be 1 hour, and the first temperature may be between 25° C. and 90° C. If a higher purity of melanin is desired, the first period of time may be increased to 3 hours.

In some embodiments, the first acidic solution may be a lactic acid having a concentration of between 1% and 10% w/w. If the first acidic solution is lactic acid, the first solid-to-liquid ratio may be between 1:10 and 1:100, the first period of time may be between 1 hour and 24 hours, and the first temperature may be between 25° C. and 90° C. For example, if the first acidic solution is lactic acid having a concentration of 1% w/w, the first time solid-to-liquid ratio may be 1:100, the first period of time may be 3 hours, and the first temperature may be 30° C. If the first acidic solution is lactic acid having a concentration of 7% w/w, the first solid-to-liquid ratio may be 1:10, the first period of time may be between 3 hours and 24 hours, and the first temperature may be between 30° C. and 90° C. If the first acidic solution is lactic acid having a concentration of 10% w/w, the first solid-to-liquid ratio may be 1:10 and the first period of time may be between 1 hour and 24 hours, and the first temperature may be between 30° C. and 90° C.

In some embodiments, during the first period of time, the first mixture is not stirred or stirred in the range of between 10 rpm and 500 rpm but preferably at 300 rpm. The first mixture is filtered or centrifuged to obtain a first solid fraction 110 comprising demineralized raw material 110 and a first fluid 109 comprising mainly of inorganic substances 109. The first solid fraction 110 is subjected to multiple rounds of washing with water to receive one or more first washing liquids. The pH level of each of the one or more first washing liquids is checked, and the first solid fraction 110 is washed until the colour of the first washing liquid is nearly transparent and within a pH in the range of between 5 and 7 but preferably 7.

Next, in step 112, deproteination of the first solid fraction 110 is carried out by adding a first alkaline solution, preferably NaOH, having a concentration of between 0.5 M and 3 M but preferably between 0.5 M and 1 M, to the first solid fraction 110 to obtain a second mixture with a second solid-to-liquid ratio of between 1:10 and 1:30 but preferably 1:20. The second mixture should be treated for a second period of time of between 30 minutes and 5 hours but preferably between 1 hour and 3 hours at second temperature between 25° C. to 900° C. but preferably between 40° C. and 60° C. The person skilled in the art would appreciate that the concentration of the first alkaline solution, the second solid-to-liquid ratio, the second period of time and the second temperature may be adjusted depending on whether the main objective is purity, yield, or content. For example, if the first alkaline solution is 1 M NaOH, the second solid-to-liquid ratio is 1:20, the second period of time is 1 hour and the second temperature is 90° C., there is a low yield of high purity melanin. If the first alkaline solution is 2 M NaOH, the second solid-to-liquid ratio is 1:20, the second period of time is 1 hour and the second temperature is 30° C., there is a high yield of low purity melanin.

In some embodiments, during the second period of time, the second mixture is not stirred at all or stirred in a range of between 10 rpm and 200 rpm but preferably at 200 rpm. The second mixture is filtered or centrifuged to obtain a second solid fraction 114 comprising demineralized and deproteinated raw material 114 and a second fluid 113 comprising mainly of proteins 113. The second solid fraction 114 is subjected to multiple rounds of washing with water to receive one or more second washing liquids. The pH level of each of the one or more second washing liquids is checked, and the second solid fraction 114 is washed until the colour of the second washing liquid is nearly transparent and/or within a pH in the range of between 7 and 9 but preferably 7.

Next, in step 116, the second solid fraction 114 which now comprises mainly melanin and chitin, a stronger treatment with a second alkaline solution, is applied to liberate melanin from the second solid fraction. The second alkaline solution, preferably NaOH, having a concentration of between 1 M and 6 M but preferably between 1 M and 3 M, is added to the second solid fraction 114 to obtain a third mixture with a third solid-to-liquid ratio of 1:10 and 1:24 but preferably at 1:20. The third mixture should be treated for a third period of time of between 1 hour and 6 hours but preferably 1 hour at a third temperature of between 70° C. and 90° C. but preferably at 90° C. The person skilled in the art would appreciate that the concentration of the second alkaline solution, the third solid-to-liquid ratio, the third period of time and the third temperature are correlated and may be adjusted relative to each other. During the third period of time, the third mixture is not stirred at all or stirred in a range of 10 rpm and 500 rpm but preferably at 300 rpm. The third mixture is filtered or centrifuged to obtain a residue 117 comprising mainly of chitin and a supernatant 118, which is solution containing melanin 118. The residue 117 is washed with water to recover any residual liberated melanin. Water is added at a volume of between 1 and 3 times the original volume of the second alkaline solution added but preferably 1.5 times. A wash liquid is extracted and the wash liquid containing the residual liberated melanin is pooled with the supernatant 118 to obtain a melanin solution. For increasing melanin purity further, insoluble substances such as chitin fibres are further removed by filtration or centrifugation. For example, a filter with mesh size of standard size 500 may be used to ensure sufficient removal of insoluble substances.

In step 120, melanin 122 is recovered from the supernatant 118 or melanin solution by precipitation through adjusting its pH using a second acid solution, preferably HCl, to obtain a fourth mixture. If the second acid solution is HCl, the second acid solution may have a concentration of 37% (w/w). The pH level of the fourth mixture is checked, and the second acid solution is added until the fourth mixture has a pH of 0 and 2 but preferably between 0 and 1. The melanin 122 is harvested by filtration or centrifugation and washed with water in order to reduce excess salts. Water is added to the melanin 122 to obtain a melanin-to-water weight ratio of between 1:20 and 1:60, but preferably 1:30. The melanin 122 is recovered by filtration or centrifugation and dried through oven-drying, spray-drying, or freeze-drying.

The following examples are provided to illustrate the present invention and should not be construed as limiting thereof:

Example 1

Demineralization tests were performed on raw material from invertebrate biomass comprising pupae shells of *Hermetia illucens* to determine the preferred conditions for demineralization.

Methods Used in Example 1

Pupae shells of *Hermetia illucens* were ground up in a blender (Robot Coupe Blixer 4, France) for 15 seconds and demineralization was carried out on the ground up pupae shells in batches of 10 g under a range of treatment conditions with constant stirring at 300 rpm with a magnetic hotplate stirrer (LLG Labware Unistirrer 5, Germany). The variables examined were the concentration of each acid, the reaction temperature, and the duration of treatment. The temperature was monitored and self-regulated by the same magnetic hotplate stirrer or incubator.

To determine the efficacy of the various treatment conditions, the amount of residual minerals in each demineralized sample was determined by measuring the residual ash content in the demineralized sample after combustion, also known as "ashing". Ash content is proportionate to the amount of minerals in a sample and would indicate the amount of residual minerals left in a sample after demineralization. Thus, the lower the ash content in the samples, the higher the efficacy of the demineralization process. The preferred ash content is any percentage below 1%. The ash content in each demineralized sample was determined as follows: each batch of demineralized pupae shells was filtered with a sieve with a mesh size of 1 mm and washed with 1.8 L water until the pH of the wash liquid was within the 5 to 7 range. Once the pH of the wash liquid was within the 5 to 7 range, the demineralized pupae shells were filtered and dried overnight in an oven at 80° C. The dried demineralized pupae shells were then weighed to obtain the mass of the dried demineralized pupae shells. The dried demineralized pupae shells were placed into two crucibles for ashing. i.e., combustion, at 600° C. for 4 hours in a chamber furnace (MRC ELF 11/68, China). Finally, the combusted demineralized pupae shells were weighed to obtain the residual mass after ashing. The residual mass of each sample after ashing is expressed as a percentage of the mass of the dried mineralized pupae shells to obtain the ash content (%) of each sample.

Results Obtained in Example 1

Figure 2:
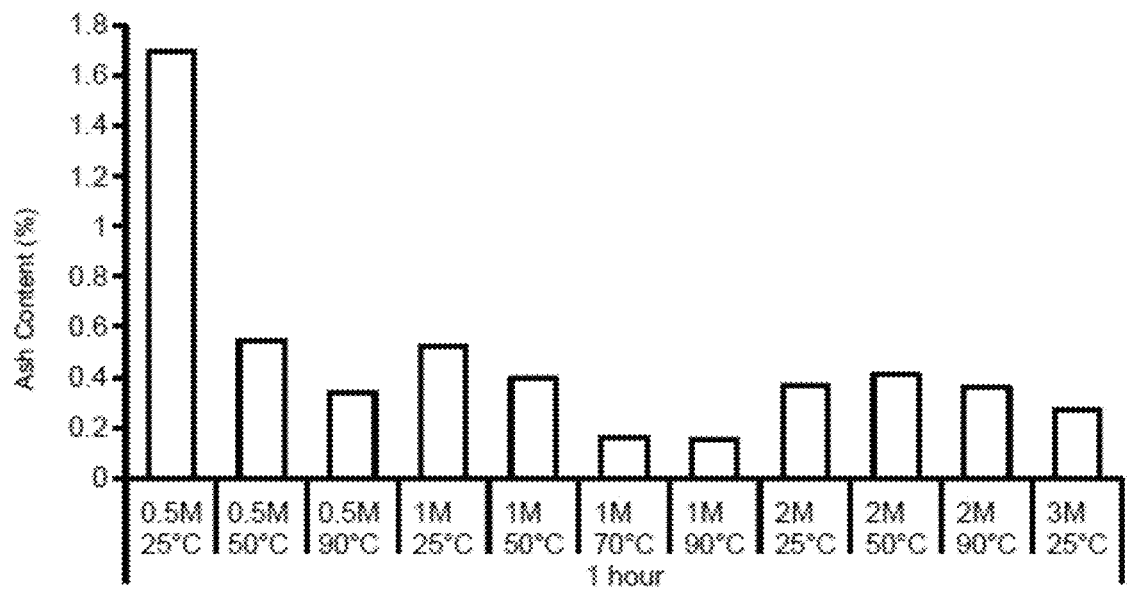
FIG. 2 is a graphical representation showing ash content of pupae shells after demineralization with HCl at various treatment conditions, in accordance with embodiments of the present disclosure.

FIG. 2 is a graphical representation showing ash content of pupae shells after demineralization with HCl at various treatment conditions, in accordance with embodiments of the present disclosure. The pupae shells were treated with between 0.5 M and 3 M HCl at a temperature between 25° C. and 90° C. for 1 hour at a pupae shell-to-solvent ratio of 1:10. As illustrated in FIG. 2, all treatment conditions, with the exception of treatment with 0.5 M HCl at 25° C., resulted in ash content of <1%. Based on the results, if 0.5 M HCl is used at a pupae shell-to-solvent ratio of 1:10, heating to a temperature of at least 50° C. would be required for sufficient demineralization. If heating is not desired, at least 1 M HCl should be used for the given ratio. A person skilled in the art would appreciate, based on the results obtained, that a reaction duration of >1 hour, would have similarly desirable results for HCl concentrations equal to or above 0.5 M.

Figure 3:
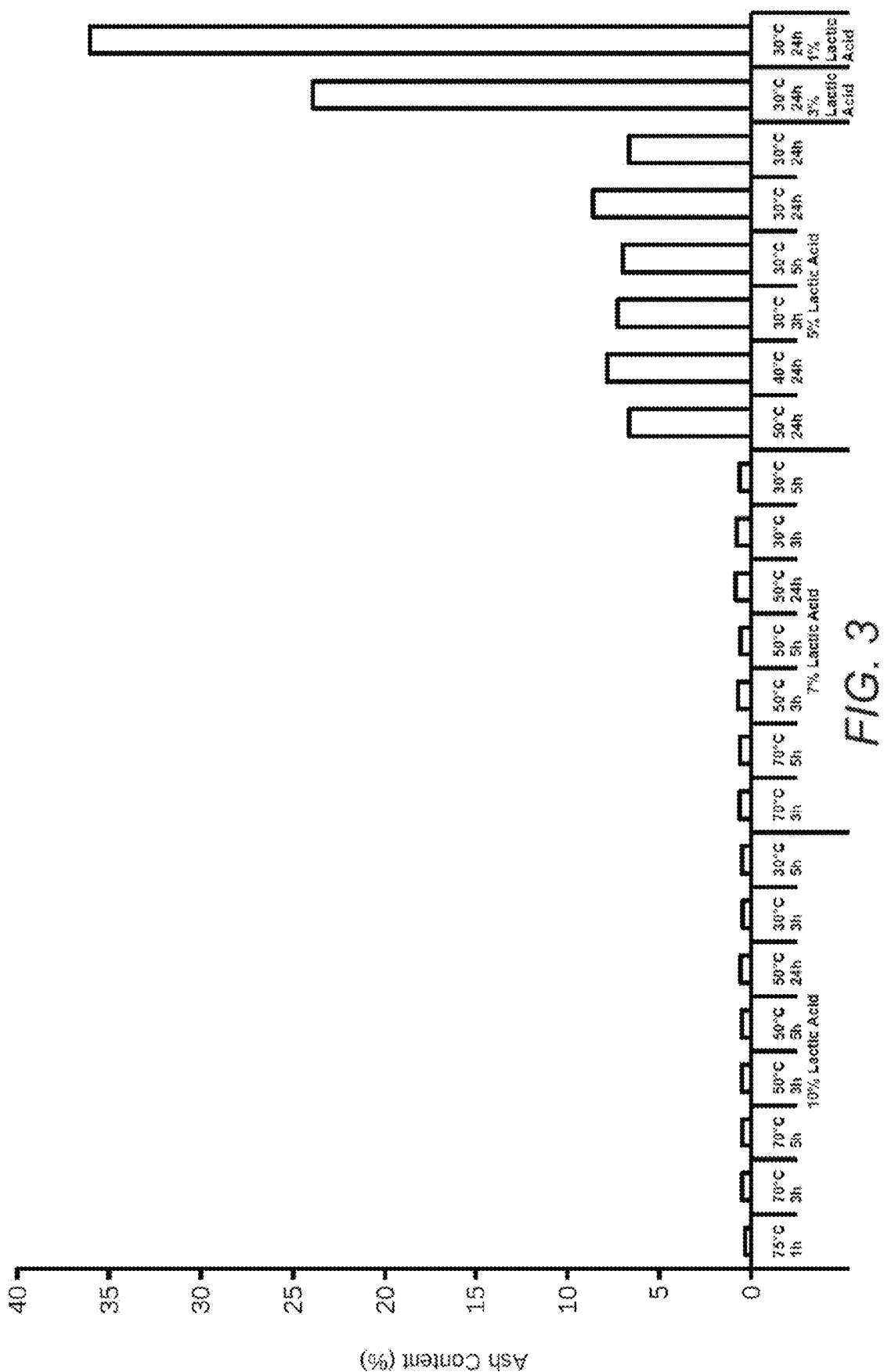
FIG. 3 is a graphical representation showing ash content of pupae shells after demineralization with lactic acid at various treatment conditions, in accordance with embodiments of the present disclosure.

FIG. 3 is a graphical representation showing ash content of pupae shells after demineralization with lactic acid at various treatment conditions, in accordance with embodiments of the present disclosure. The pupae shells were treated with between 1 and 10% w/w lactic acid at a temperature between 30° C. and 75° C. for 1 and 24 hours at a pupae shell-to-solvent ratio of 1:10. As illustrated in FIG. 3, a minimum of 7% w/w lactic acid is required to lower the ash content to <1% at the abovementioned conditions. A person skilled in the art would appreciate, based on the results, that a reaction temperature of >75° C. or a reaction duration of >24 hours, would have similarly desirable results. 5% w/w lactic acid was unable to sufficiently demineralise at all temperatures and reaction durations tested.

Figure 4:
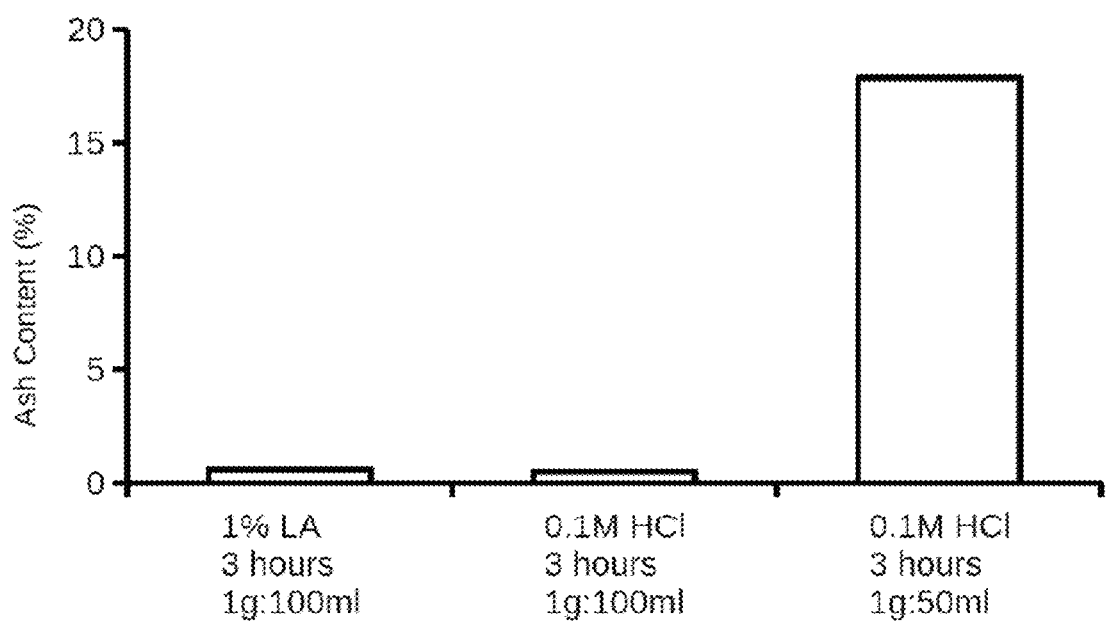
FIG. 4 is a graphical representation showing ash content of pupae shells after demineralization with either HCl or lactic acid, in accordance with embodiments of the present disclosure.

FIG. 4 is a graphical representation showing ash content of pupae shells after demineralization with either HCl or lactic acid, in accordance with embodiments of the present disclosure. The pupae shells were treated with different concentrations of acids at 30° C. for 3 hours with differing pupae shell-to-solvent ratios. The results indicate that the ability of acids to lower the ash content to <1% may also be dependent on the actual amount of acid present in the reaction, rather than simply its concentration. As illustrated in FIG. 4, when the pupae shell-to-solvent ratio was increased to 1:50, demineralization with 0.1 M HCl resulted in an ash content of 17.87%. The amount of acid in this reaction was equivalent to that of a reaction using 0.5 M HCl at a pupae shell-to-solvent ratio of 1:10 and was similarly insufficient to lower the ash content to <1%. When the pupae shell-to-solvent ratio was further increased to 1:100, 0.1 M HCl was sufficient to result in an ash content of <1% as the amount of acid in this reaction was equivalent to that of a reaction using 1 M HCl at a pupae shell-to-solvent ratio of 1:10. Similarly, when the pupae shell-to-solvent ratio was increased to 1:100, even 1% w/w lactic acid (approximately 0.13 M) sufficiently demineralized the shells such that the ash content was <1%. The results indicate that very low concentrations of acids, which are by nature less corrosive, may be used to perform the demineralization reaction even at mild temperature conditions. Also, milder acids, such as lactic acid, whose production is sustainable and environmentally benign, may be used without any detrimental effect on the ash content of the demineralized material.

Example 2

Deproteination tests were performed on demineralized pupae shells of *Hermetia illucens*.

Methods Used in Example 2

An experiment was done to determine the optimal treatment conditions for deproteination of demineralized pupae shells of *Hermetia illucens* by subjecting pupae shells demineralized with a standardized demineralization protocol to various deproteination conditions before extracting melanin with a standardized melanin liberation protocol to determine the raw melanin yield.

Pupae shells of *Hermetia illucens* were ground up in a blender (Robot Coupe Blixer 4, France) for 15 seconds subjected to a standardized demineralized protocol of treatment with 1 M HCl at 70° C. to obtain demineralized pupae shells. Deproteination was carried out on the demineralized pupae shells in batches of 15 g under a range of treatment conditions with constant stirring at 200 rpm with a magnetic hotplate stirrer (LLG Labware Unistirrer 5, Germany). The volume of NaOH added was standardized at 30 ml for each reaction to obtain a demineralized shell-to-solution ratio of 1:20.

After the designated treatment duration had passed, the reaction mixture of each batch of deproteinated pupae shells was filtered with a sieve of mesh size 1 mm to separate the deproteinated pupae shells from the filtrate. The deproteinated pupae shells were washed three times with a total of 1.8 L of water, and dried overnight in an oven at 80° C. The mass of the dried deproteinized pupae shells was recorded and used to calculate the ratio of deproteinized mass-to-demineralized mass.

The amount of melanin remaining in each deproteinated sample was measured by extracting melanin from each batch of deproteinated pupae shells with a standardized melanin liberation protocol. 10 g of dried deproteinated pupae shells were treated with a standardized melanin liberation protocol where 200 ml of 3 M NaOH was added to the deproteinated pupae shells and incubated at 90° C. for 1 hour. Alternatively, for samples with less than 10 g of dry mass, the volume of 3 M NaOH added was adjusted such that the ratio of dried deproteinated pupae shells-to-solvent ratio was 1:20.

The melanin liberation reaction mixtures were filtered through a sieve with a mesh size of 1 mm, and further filtered through a nylon mesh of standard size 500 to obtain the filtrate. 200 ml of water was added to the residue to obtain a suspension. This suspension was similarly filtered through a sieve with a mesh size of 1 mm, and further filtered through a nylon mesh of standard size 500. This filtrate was then added to the filtrate obtained from filtration of the melanin liberation reaction mixture to obtain a filtrate mixture. This was to maximize melanin yield and to recover as much of the liberated melanin as possible.

The melanin in the filtrate mixture was precipitated by gradually adding 50 ml of 37% (w/w) HCl to the filtrate mixture while stirring with a magnetic rod until the final pH reached a value of between 0 and 1, resulting in a suspension. The suspension was centrifuged in 50 ml falcon tubes at 3220×g in a swinging bucket rotor (Eppendorf 5810R, Germany), decanted and pooled into a single tube. The pellet obtained was washed twice by resuspension in 45 ml of water and centrifugation. The resulting pellet was dried overnight in an oven at 80° C. The melanin pellet from each treatment was weighed to obtain the melanin mass.

Two control samples were also prepared by directly carrying out melanin liberation on pupae shells demineralized with the standardized demineralization protocol without first carrying out deproteination. The first melanin liberation condition was treatment with 3 M NaOH at 90° C. for 1 hour, while the second melanin liberation condition was treatment with 3 M NaOH at 90° C. for 2 hours, the additional hour included to account for the skipped reaction time from the deproteination step.

The purity and quantity of melanin obtained was measured through ultraviolet-visible spectroscopy (UV-Vis) and fluorimetry. UV-Vis was carried out to obtain absorbance spectra of each sample. 10 mg of each sample was dissolved in 50 ml of 0.05 M NaOH, vigorously mixed and centrifuged to remove any residual, undissolved particles. The supernatant was diluted with 0.05 M NaOH to a concentration of 60 mg/L. Each supernatant was added to a quartz cuvette and measured in a UV-Vis spectrophotometer (Agilent Cary 50, United States) at a wavelength range from 200 nm to 1100 nm at a scan rate of 600 nm/min in Dual Beam Mode with baseline correction. 0.05M NaOH was used in the same quartz cuvette for baseline correction. Absorbance spectra of supernatant obtained from the deproteination step was also obtained by collecting a portion of the supernatant, centrifuging the supernatant to remove any undissolved particles, and then diluting the supernatant either 10-fold or 20-fold.

Fluorimetry was performed to quantify the melanin obtained. While melanin does not fluoresce, its degradation products will fluoresce due to the presence of indole units. This fluorescence can be used to quantify the unknown melanin content by using synthetic dihydroxyindole (DHI) melanin as a calibration standard with the assumption that synthetic melanin is 100% pure, as it consists solely of repeating units of DHI. 10 mg of each sample was dissolved in 25 ml of a solution comprising 1 M NaOH and 10% v/v dimethyl sulfoxide (DMSO) and heated in a water bath for 5 min at 80° C. The resulting solution was centrifuged to remove undissolved particles. 2 ml of the resulting supernatant was pipetted into a 50 ml falcon tube, to which 3 ml of 30% hydrogen peroxide was added resulting in a melanin concentration of 160 mg/L. After a 4-hour incubation period, 375 µl of this solution was added to 625 µl 1 M NaOH with 10% DMSO) in 1.5 ml tubes to obtain a final melanin concentration of 60 mg/L. 250 µl of this solution was pipetted into wells of a flat-bottom 96-well fluorimetry plate (Greiner Bio-One). Concurrently, a solution of synthetic melanin was prepared in the same way and diluted such that a range of concentrations (5, 10, 20, 40, 60, 80, 100, 120 mg/L) was achieved. The fluorescence of each solution (measured in Relative Fluorescence Units, or RFU) was measured with an excitation wavelength of 470 nm and an emission wavelength of 550 mu using a fluorimeter (Thermo Fisher Scientific Varioskan Flash 3001, Finland). Each RFU measurement was subtracted by the RFU from a blank consisting of 250 µl 1 M NaOH (10% DMSO).

A standard curve of synthetic melanin similarly incubated for 4 hours after hydrogen peroxide was added was obtained within a range of 0 to 120 mg/L synthetic melanin (Concentration=16.5899233160817*RFU, $r^2$=0.9998354823) forced through the origin of the coordinate system. The slope of the curve was used to calculate the unknown concentration of melanin in each sample obtained by the different treatments.

The purity of melanin obtained was calculated according to the following formula:

$$\text{Purity (\%)} = \frac{\text{Measured concentration (mg/L)}}{\text{Concentration of sample (60 mg/L)}} \times 100$$

The relative melanin yield was calculated according to the following formula:

$$\text{Relative Extraction Yield (\%)} = \frac{\text{Mass of melanin pellet (g)}}{\text{Mass of raw pupae shells used (g)}} \times 100$$

The mass of raw pupae shells was estimated according to the following formula:

$$\text{Mass of raw pupae shells (g)} = \frac{\text{Mass of deproteinised shells used (g)}}{\frac{\text{Ratio of deproteinised: demineralized shells}}{0.41}} \times 100$$

0.41 being the average ratio of demineralized-to-raw pupae shells and was calculated over several batches of demineralization reactions.

The actual percentage of melanin contained in the melanin pellet and extracted from the raw pupae shells, was calculated according to the following formula:

$$\text{Percentage of melanin extracted (\%)} = \frac{\left(\frac{\text{Purity (\%)}}{100}\right) \times \text{Mass of melanin pellet (g)}}{\text{Mass of raw pupae shells (g)}} \times 100$$

Results Obtained in Example 2

Figure 5:
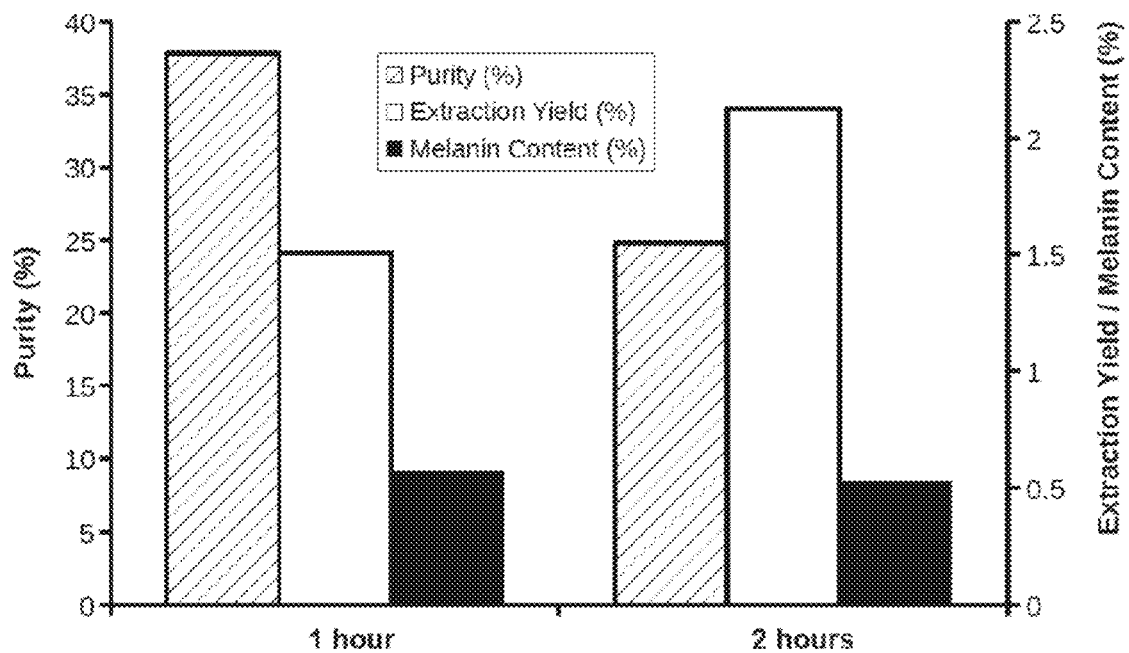
FIG. 5 is a graphical representation showing purity, extraction yield and melanin content of demineralized shells directly subjected to melanin liberation without deproteination, in accordance with embodiments of the present disclosure.

FIG. 5 is a graphical representation showing purity, extraction yield and melanin content of demineralized shells directly subjected to melanin liberation without deproteination, in accordance with embodiments of the present disclosure. The demineralized pupae shells were treated with 3 M NaOH at 90° C. for a duration of either 1 or 2 hours. As illustrated in FIG. 5, when demineralized pupae shells were directly subjected to melanin liberation conditions for 1 hour, a purity of 37.87% and a yield of 1.51% was achieved. When the reaction time was increased to 2 hours, purity dropped dramatically to 24.79%, whereas the yield increased to 2.13%. However, the actual percentage of melanin extracted decreased slightly, from 0.57% to 0.53%. Based on the results obtained, if demineralized pupae shells are subject to harsh conditions and extensive reaction duration without prior deproteination, more melanin is liberated and degraded, leading to lowered melanin purity. Other material such as proteins are also liberated and subsequently precipitated, further lowering the purity of melanin obtained. Thus, if melanin extraction were carried out without a prior gentler deproteination step, only a purity of around 38% may be achieved. Prolonging the reaction time would not be beneficial to the extraction process as although it increases the yield, it also decreases the purity leading to a similar melanin yield with lower purity.

Figure 6:
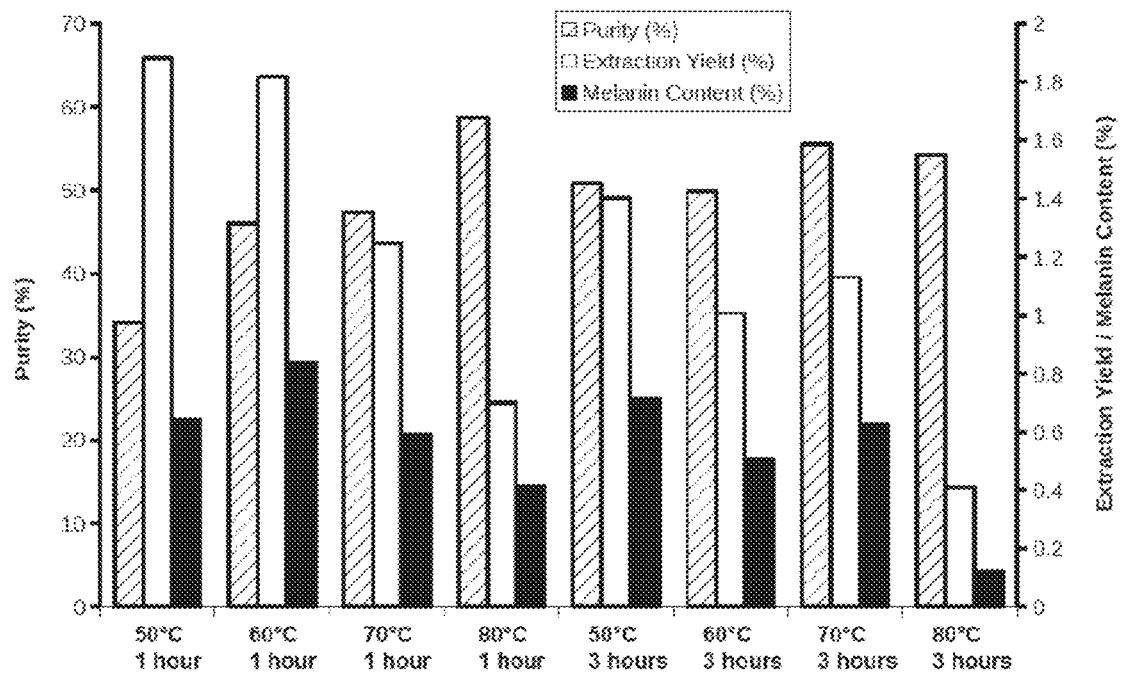
FIG. 6 is a graphical representation showing purity, extraction yield and melanin content of demineralized shells subject to deproteination with 0.5 M NaOH, in accordance with embodiments of the present disclosure.

FIG. 6 is a graphical representation showing purity, extraction yield and melanin content of demineralized shells subject to deproteination with 0.5 M NaOH, in accordance with embodiments of the present disclosure. The demineralized pupae shells were treated with 0.5M NaOH at a temperature between 50° C. and 80° C. for 1 hour or 3 hours. As illustrated in FIG. 6, the purity of the melanin mass increased with increasingly harsh deproteination conditions as determined by reaction duration and reaction temperature due to increased deproteination efficiency. However, the melanin yield decreased as the harsh deproteination conditions caused the melanin to be degraded and to leach out from the pupae shells during the deproteination reaction. The melanin purity obtained was highest when the pupae shells were treated at 70° C. for 3 hours, with 55.55% purity, and at 80° C. for one hour, with 58.71% purity. Although treatment at 80° C. for one hour led to a higher purity of 58.71%, the melanin yield reduced more drastically due to the leaching effect. Thus, treatment at 70° C. for 3 hours may be preferred to obtain more melanin. Optionally, treatment at 80° C. for one hour may be preferred to obtain melanin with a higher purity.

Figure 7:
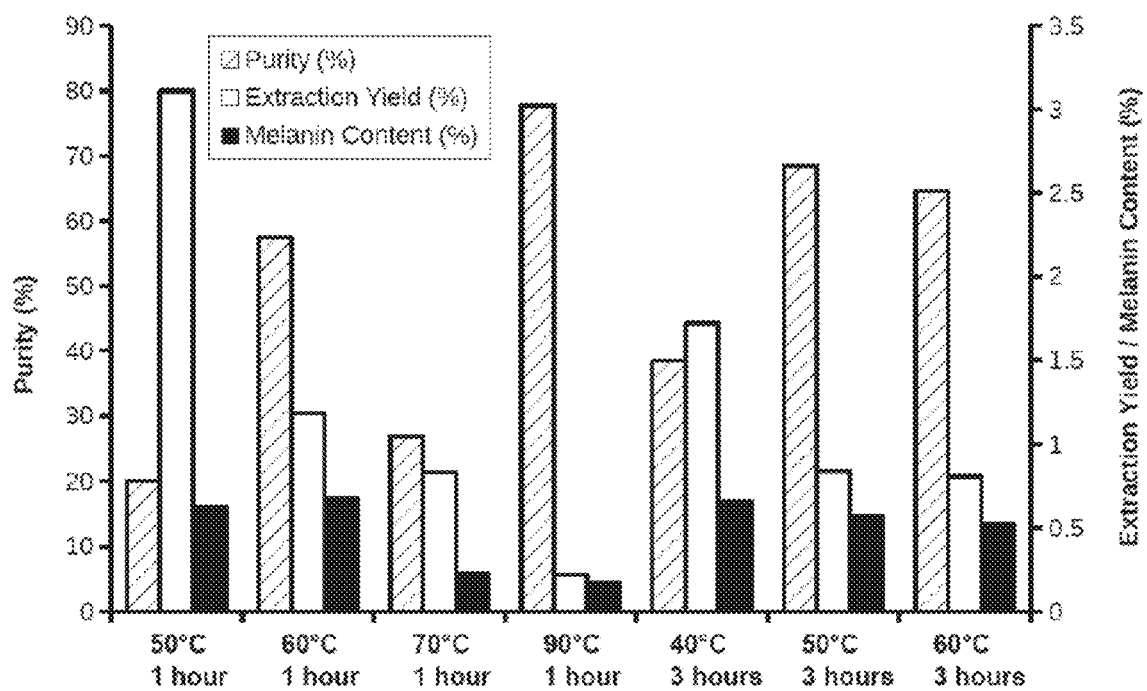
FIG. 7 is a graphical representation showing the purity, extraction yield and melanin content of demineralized shells subject to deproteination with 1 M NaOH, in accordance with embodiments of the present disclosure

FIG. 7 is a graphical representation showing the purity, extraction yield and melanin content of demineralized shells subject to deproteination with 1 M NaOH, in accordance with embodiments of the present disclosure. The demineralized pupae shells were treated with 1 M NaOH at a temperature between 40° C. and 90° C. for 1 or 3 hours. As illustrated in FIG. 7, the melanin purity obtained after deproteination at 50° C. for 1 hour (20.05%) was drastically lower than the melanin purity obtained from demineralized pupae shells that underwent melanin liberation without deproteination (24.79% to 37.87%). Increasing the temperature by 10° C. to 60° C. resulted in a marked increase in purity to 57.45%. However, increasing the temperature to 70° C. to 90° C. for 1 hour resulted in an unstable fluctuation in purity and a marked decrease in the actual melanin content within the extracted melanin mass. Although a high purity of 77.72% may be achieved with treatment at 90° C. for 1 hour, the yield decreased dramatically. It is likely that at such temperatures, a majority of melanin was removed in the deproteination step. As illustrated in FIG. 7, treatment at lower temperatures (50° C. to 60° C.) for 3 hours resulted in purity ranging from 64.69% to 68.50%, with a stable melanin yield of 0.81% to 0.84% with no marked decrease in the actual percentage of melanin extracted melanin content within the extracted melanin mass (0.52% to 0.57%). However, treatment at 40° C. for 3 hours did not produce a higher purity as compared to melanin which was directly liberated with 3 M NaOH at 90° C., indicating that a temperature of 50° C. and above is necessary for the sufficient removal of proteins and the corresponding increase in purity. Thus, where the concentration of NaOH used is 1 M, the optimal conditions appear to be treatment at 50° C. to 60° C. for at least 3 hours, although other conditions may be implemented depending on whether the focus is on melanin yield or melanin purity.

Figure 8:
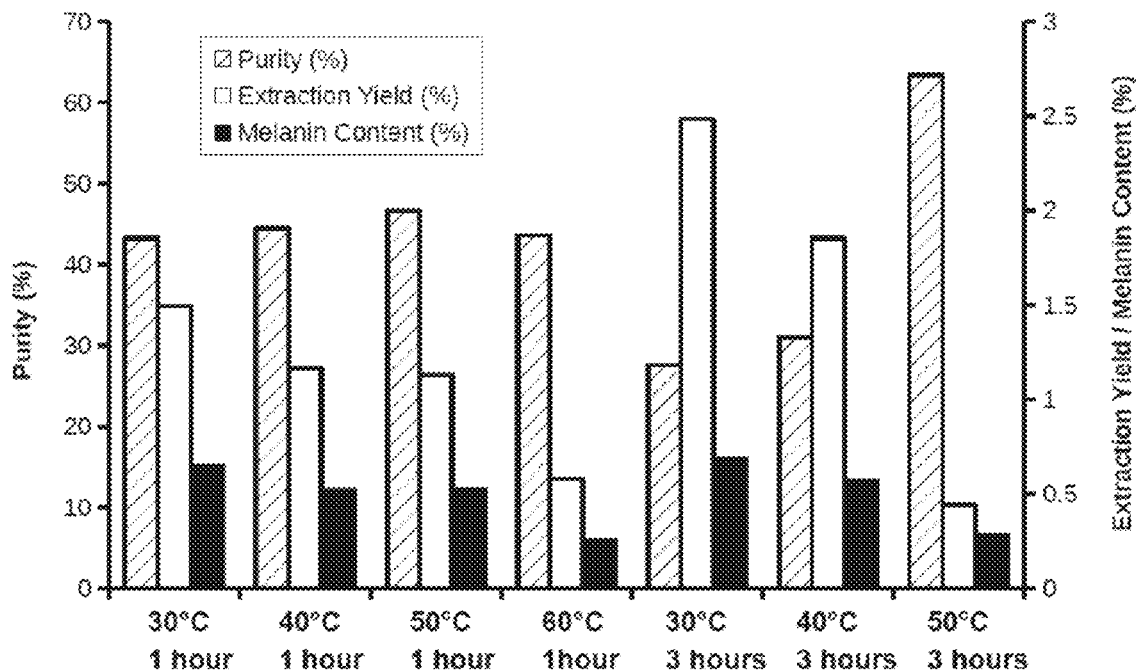
FIG. 8 is a graphical representation showing purity, extraction yield and melanin content of demineralized shells subject to deproteination with 2 M NaOH, in accordance with embodiments of the present disclosure.

FIG. 8 is a graphical representation showing purity, extraction yield and melanin content of demineralized shells subject to deproteination with 2 M NaOH, in accordance with embodiments of the present disclosure. The demineralized pupae shells were treated with 2 M NaOH at a temperature between 40° C. and 60° C. for 1 or 3 hours. As illustrated in FIG. 8, when the demineralized pupae shells were treated at 30 to 50° C. for 1 hour, the melanin purity obtained ranged from between 43.26% and 46.59%, which was a slightly higher purity than the melanin purity obtained from demineralized pupae shells that underwent melanin liberation without deproteination (24.79 to 37.87%). Increasing the temperature to 60° C. resulted in lower melanin yield indicating a higher level of melanin leaching. As illustrated in FIG. 8, increasing the reaction time to 3 hours led to a lower purity but higher melanin yield when the treatment was carried out at 30 and 40° C. A similar pattern was also observed in the melanin mass obtained from demineralized pupae shells that underwent melanin liberation without deproteination. Although there was an increased melanin mass, degradation may have occurred along with other material such as proteins being liberated with the melanin. When the demineralized pupae shells were treated at 500° C. for 3 hours, the purity of the melanin mass increased to 63.38% and the yield decreased to 0.44%, indicating a complex interplay between melanin liberation, melanin degradation and the removal of proteins or other unidentified material. The actual percentage of melanin extracted decreased to 0.28%, indicating that too much melanin loss occurred during deproteination treatment. Therefore, at a concentration of 2 M NaOH, improvement in the purity of melanin may be achieved between 1 and 3 hours, at a temperature range of between 30° C. and 60° C.

Figure 9:
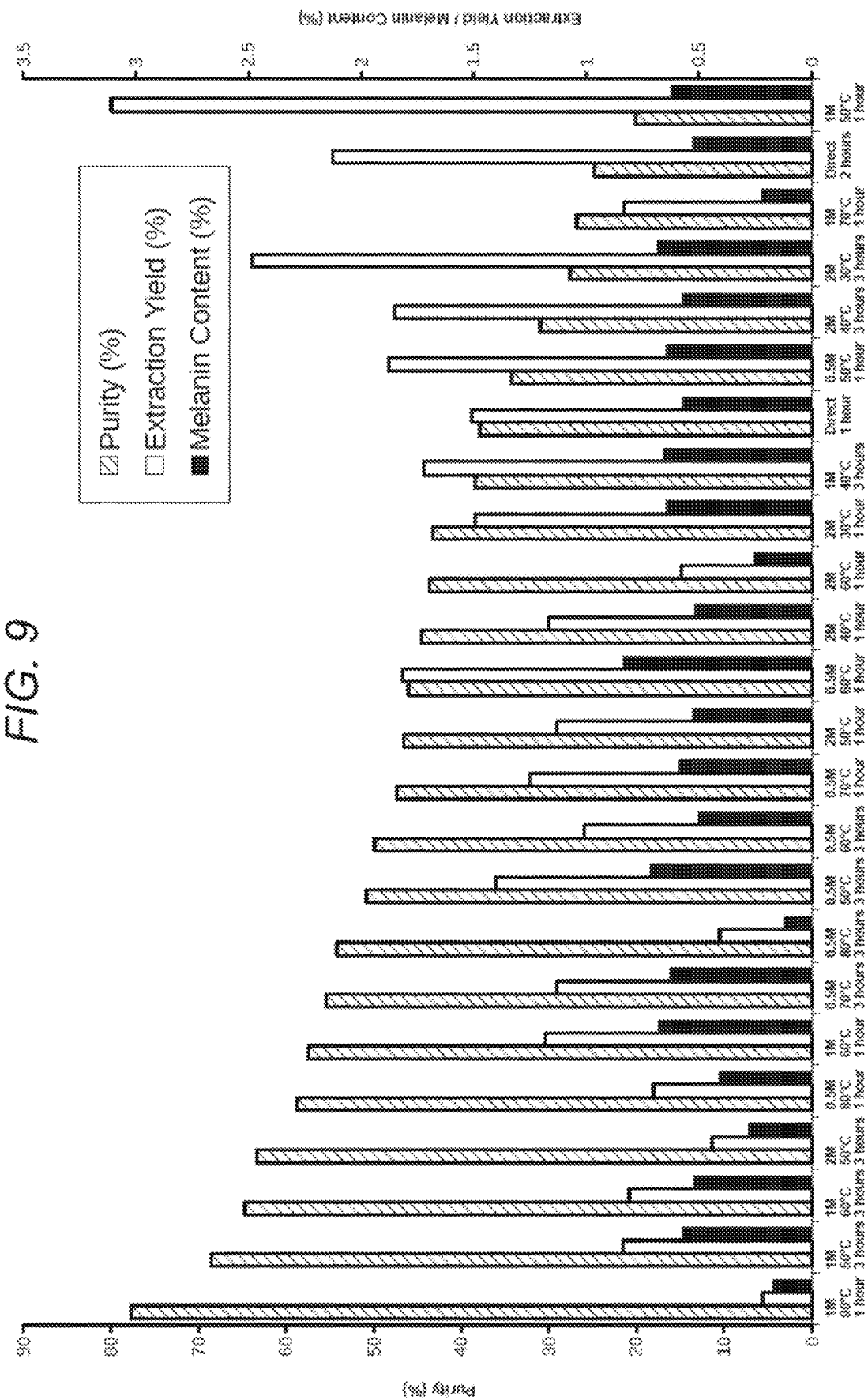
FIG. 9 is a graphical representation showing purity, extraction yield and melanin content of demineralized shells arranged in order of decreasing purity, in accordance with embodiments of the present disclosure.

FIG. 9 is a graphical representation showing purity, extraction yield and melanin content of demineralized shells arranged in order of decreasing purity, in accordance with embodiments of the present disclosure. In general, but with exceptions, a higher purity of melanin was obtained when the demineralized pupae shells underwent deproteination with 0.5 to 2 M NaOH at 30 to 90° C. for 1 to 3 hours as compared to when the demineralized pupae shells directly underwent melanin liberation without a prior deproteination step. Deproteination with 1 M NaOH at 50° C. to 60° C. for 3 hours produced the best results in terms of purity and yield, with no loss of actual melanin content within the melanin mass when compared to that of directly liberated melanin. When the temperature was increased to 900° C., melanin was lost in large amounts, despite a shorter reaction time of 1 hour. When the concentration of NaOH was increased to 2 M, melanin was again lost in large amounts, despite a gentle reaction temperature of 50° C. Given that heating to the desired reaction temperature takes a longer time on an industrial scale, reaction conditions of 1 M NaOH at 50 to 60° C. may be preferred for large scale extractions. In general, a majority of the melanin obtained had purity levels of between 38.43% and 77.72% or yields of between 0.22% and 3.11%. The highest purity level obtained (77.72%) in this Example 2 with embodiments of the present disclosure were higher than melanin obtained from prior solutions.

Figure 10:
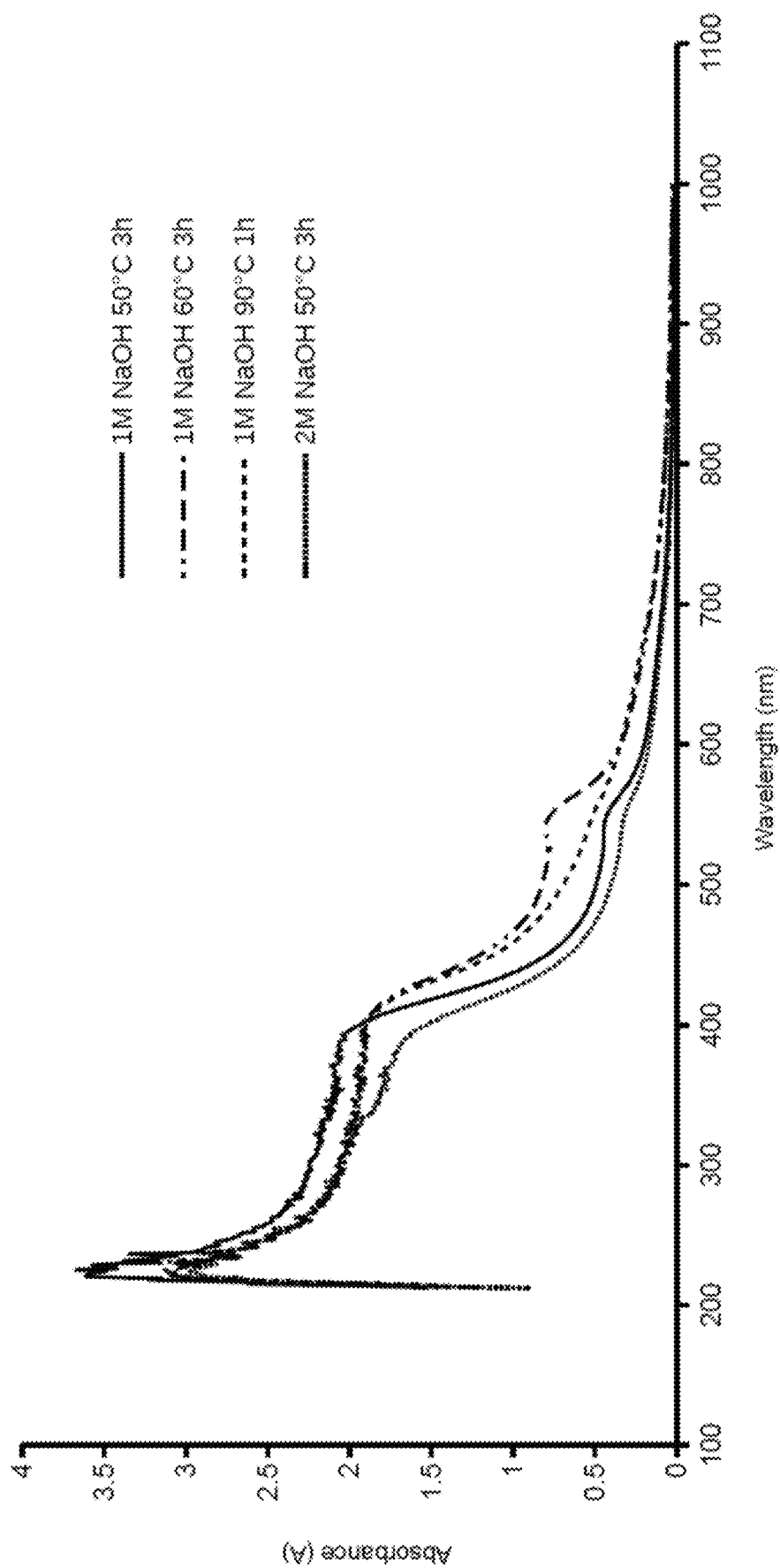
FIG. 10 is a graphical representation showing UV-Vis absorbance spectra obtained from the supernatant extracted after deproteination at various conditions, in accordance with embodiments of the present disclosure.
Figure 11:
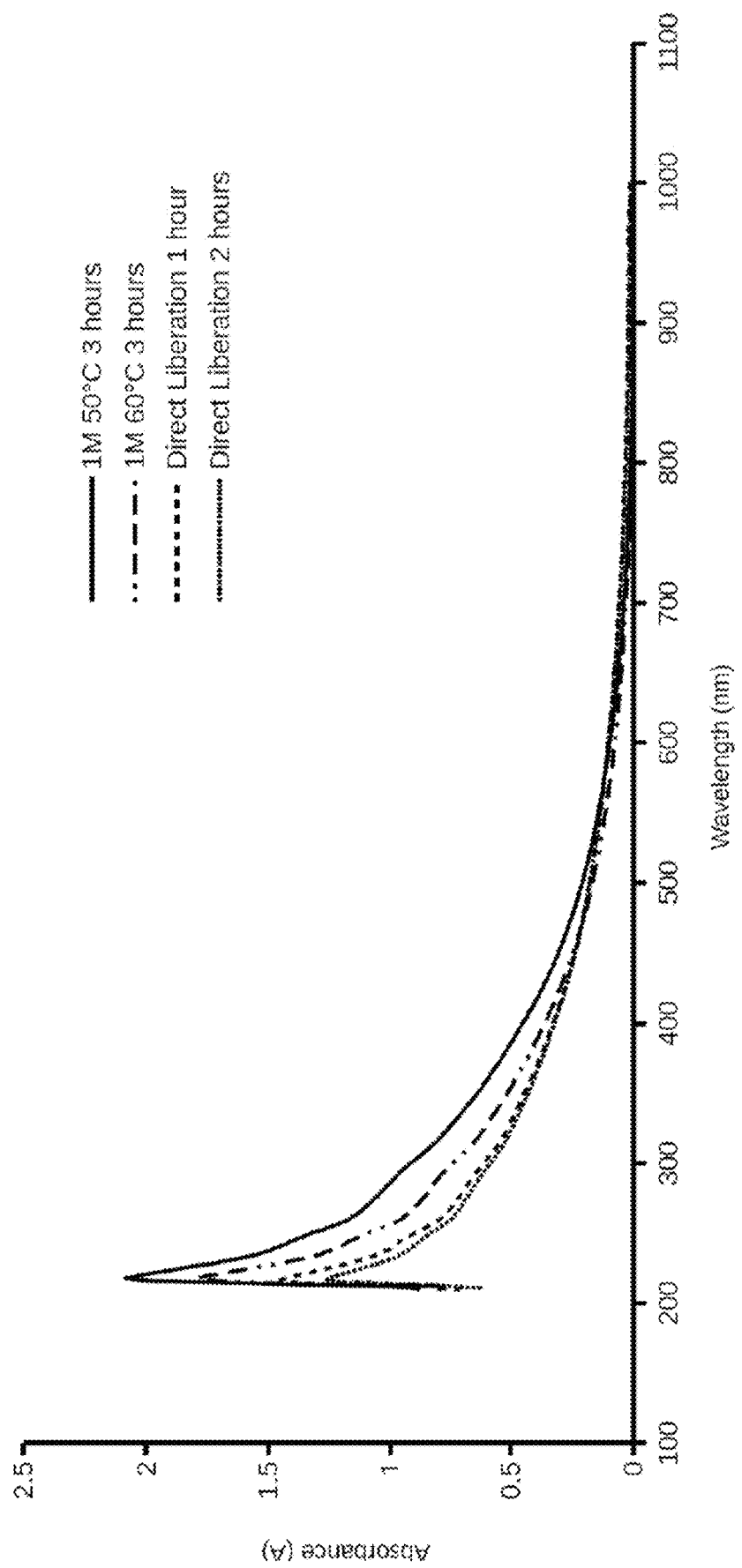
FIG. 11 is a graphical representation showing UV-Vis absorbance spectra obtained from dissolving melanin solids obtained from demineralized pupae shells that underwent deproteination and from demineralized pupae shells that underwent melanin liberation without deproteination, in accordance with embodiments of the present disclosure.

FIG. 10 is a graphical representation showing UV-Vis absorbance spectra obtained from the supernatant extracted after deproteination at various conditions, in accordance with embodiments of the present disclosure. FIG. 11 is a graphical representation showing UV-Vis absorbance spectra obtained from dissolving melanin solids obtained from demineralized pupae shells that underwent deproteination and from demineralized pupae shells that underwent melanin liberation without deproteination, in accordance with embodiments of the present disclosure. Absorbance peaks at ~220 nm were found in the absorbance spectra of both the supernatants (FIG. 10) and melanin (FIG. 11), which may be attributed to the presence of melanin. There were comparatively gentler gradients up till ~400 nm in the spectra of the supernatants (FIG. 10), which may be attributed to the presence of amino acids, peptides, or cuticular proteins such as sclerotin. The slight peak or plateau at ~540 nm for the supernatant extracted after deproteination with 1 M NaOH at 50° C. and 60° C. (FIG. 10) may explain the dark amber colour specific only to the supernatants of these two treatments and may be indicative of tanned proteins such as sclerotin or its degraded products.

As illustrated in FIG. 11, the dissolved melanin solids that underwent a deproteination step had higher absorbance within the UV and visible light spectra as compared to those which did not undergo deproteination, which is indicative of a higher melanin content. In addition, as all the samples were diluted to the same concentration of 60 mg/L, the higher absorbance may further indicate a higher purity.

Example 3

Melanin liberation tests were performed on deproteinated pupae shells of *Hermetia illucens*.

Methods Used in Example 3

An experiment was done to determine the optimal treatment conditions for melanin liberation from deproteinated pupae shells of *Hermetia illucens* by subjecting pupae shells demineralized and deproteinated with standardized protocols to various melanin liberation conditions.

300 g of pupae shells of *Hermetia illucens* were ground up in a blender (Robot Coupe Blixer 4, France) for 15 seconds, and subjected to demineralization with 30 L of 1 M HCl at 70° C. for 1 hour to obtain demineralized pupae shells. The demineralized pupae shells were washed with 40 L of water and filtered with a sieve of mesh size 1 mm until the pH of the wash liquid was between 5 and 7. The demineralized pupae shells were then dried overnight in an oven at 80° C. The dried demineralized pupae shells were weighed, and the demineralized pupae shell-to-raw pupae shell ratio was determined to be 121.66 g:300 g or 0.41. The dried demineralized pupae shells were deproteinated with 2.43 L of 1 M NaOH at 50° C. for 3 hours, washed with a total of 30 L water and filtered, then dried overnight in an 80° C. oven. The dried deproteinated pupae shells were weighed, and the deproteinated pupae shell-to-demineralized pupae shell ratio was determined to be 94.1 g:121.66 g or 0.77.

Melanin liberation was carried out on the deproteinated pupae shells in batches of 10 g under a range of treatment conditions at a deproteinated pupae shell-to-solvent ratio of 1:20 with constant stirring at 200 rpm with a magnetic hotplate stirrer (LLG Labware Unistirrer 5, Germany) for 1 hour. After the designated treatment duration had passed, the reaction mixtures were filtered with a sieve of mesh size 1 mm, and further filtered through a nylon mesh of standard size 500 to obtain the filtrate. 200 ml of water was added to the residue to obtain a suspension. This suspension was similarly filtered through a sieve with a mesh size of 1 mm, and further filtered through a nylon mesh of standard size 500. This filtrate was then added to the filtrate obtained from filtration of the melanin liberation reaction mixture to obtain a filtrate mixture.

The melanin in the filtrate mixture was precipitated by gradually adding 50 ml of 37% (w/w) HCl to the filtrate mixture while stirring with a magnetic rod until the final pH reached a value of between 0 and 1, resulting in a suspension. The suspension was centrifuged in 50 ml falcon tubes at 3220×g in a swinging bucket rotor (Eppendorf 5810R, Germany), decanted and pooled into a single tube. The pellet obtained was washed twice by resuspension in 45 ml of water and centrifugation. The resulting pellet was dried overnight in an oven at 80° C. The melanin pellet from each treatment was weighed to obtain the melanin mass.

Fluorimetry and subsequent calculations were performed according to the method described in Example 2, except that the mass of raw pupae shells was estimated according to the following formula:

$$\text{Mass of raw pupae shells (g)} = \frac{\frac{\text{Mass of deproteinised shells used (g)}}{0.77}}{0.41} \times 100$$

Results Obtained in Example 3

Figure 12:
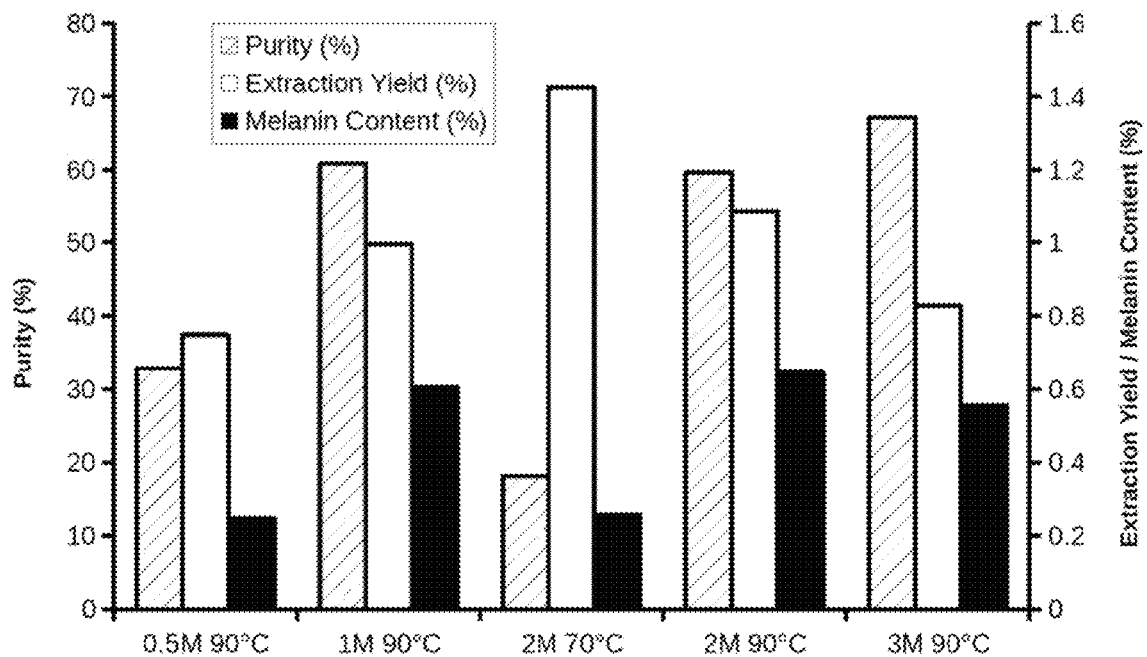
FIG. 12 is a graphical representation showing purity, extraction yield and melanin content of deproteinated pupae shells, in accordance with embodiments of the present disclosure.

FIG. 12 is a graphical representation showing purity, extraction yield and melanin content of deproteinated pupae shells, in accordance with embodiments of the present disclosure. The deproteinated pupae shells were treated with 0.5 to 3 M NaOH at a temperature of 90° C. for one hour. As illustrated in FIG. 12, the melanin extracted from deproteinated pupae shells with treatment in 3 M NaOH at 90° C. had the highest purity, while the melanin extracted from deproteinated pupae shells with treatment in 0.5 M NaOH at 90° C. had the lowest purity. In addition, it was not possible to fully dissolve the melanin pellet obtained through the 0.5M NaOH treatment, while melanin pellets obtained from all other treatments were easily soluble. Furthermore, the actual melanin content extracted from raw pupae shells for the 0.5 M NaOH treatment was less than half that of all treatments performed at 90° C. Therefore, 0.5 M NaOH may not be a suitable condition for melanin liberation.

Melanin liberation with 2 M NaOH at 70° C. resulted in melanin with markedly lower purity, and the actual melanin content decreased by more than half when compared to the 1 M, 2 M, and 3 M NaOH, 90° C. treatments. Thus, although treatment with 70° C. may result in melanin liberation, it does not effectively liberate most of the melanin. Melanin liberation with treatment in 1 to 3 M NaOH at 90° C. resulted in melanin with similar purity (59.68-67.21%) and yield (0.83-1.09%). The actual melanin content extracted had a range of 0.56 to 0.65%. Based on the results obtained, the optimal conditions for melanin liberation appears to be treatment with 1 M to 3 M NaOH at a temperature of at least 90° C. for 1 hour. The highest purity level obtained (80.72%) in this Example 3 using embodiments of the present disclosure were higher than melanin obtained from prior solutions.

Example 4

An experiment was carried out to obtain melanin from 124 g of dried pupae shells of *Hermetia illucens* using the presently disclosed method.

The used invertebrate biomass was dried empty pupae shells from the Black Soldier Fly (*Hermetia illucens*). 124 g of dried empty pupae shells were collected from an artificial rearing process and separated from macroscopic contaminants such as plastics, feed, and frass. The dried empty pupae shells were briefly ground up in a blender (Robot Coupe Blixer 4, France) to ensure rupturing of any unenclosed pupae and dead adults and sufficient exposure of proteins, fats, and minerals to the subsequent steps in the presently disclosed method.

The 124 g of raw material obtained after rupturing of the dried pupae shells was demineralized in 1.24 L of 1 M hydrochloric acid. The mixture was kept on a temperature-controlled hot plate (Witeg MSH-20D, Germany) at 70° C. and stirred with an overhead stirrer (IKA RW20, Germany) at about 200 rpm for 1 hour.

The demineralized first solid fraction was obtained by pouring the mixture repeatedly through a sieve of mesh size 1 mm and washed 6 times with a total of 24 L water, until the pH was between 5 and 7. The wet first solid fraction was dried in an 80° C. oven overnight and weighed. The dry weight of the first solid fraction obtained was determined to be 50.3 g, indicating a weight loss of approximately 59% from the original starting material. 1 L of 1 M sodium hydroxide was added to the first solid fraction and the resulting mixture was stirred at 200 rpm, for 3 hours, 50° C.

The second solid fraction was obtained by pouring the mixture repeatedly through a sieve of mesh size 1 mm and washed 6 times with a total of 24 L water, until the second washing liquid was clear, thus ensuring that most of the dissolved proteins had been removed. The wet second solid fraction was dried in an 80° C. oven overnight. The dry weight of the second solid fraction obtained was determined to be 38.5 g which indicates a weight loss of approximately 69% from the original starting material.

Melanin was then liberated from the second solid fraction by adding 0.75 L of 3 M sodium hydroxide to the second solid fraction, and the resulting mixture was stirred at 200 rpm, for 1 hour at 90° C. The melanin-containing supernatant was extracted by filtering the mixture through a sieve of mesh size 1 mm, and then a nylon cloth of standard mesh size 500. 0.25 L water was used to wash the residue and to capture more melanin in the wash liquid, and this solution was similarly filtered to obtain more melanin-containing supernatant.

The melanin-containing supernatant was placed in a beaker and stirred at 200 rpm by a magnetic stirrer (Witeg MSH-20D, Germany). The pH was adjusted to the 0-1 range with 187.5 mL 37% (w/w) HCl to precipitate melanin. The mixture was centrifuged at 3220×g for 5 min in a swinging bucket centrifuge (Eppendorf 5810R, Germany) to pellet the melanin mass.

After centrifugation, the liquid was discarded. The pelleted melanin mass was submerged and mixed in 150 ml water and centrifuged at 3220×g for 5 min. The supernatant was decanted, and the pelleted melanin was again mixed with 150 ml water and centrifuged, before it was decanted and dried overnight in an oven at 80° C. The dry weight of the melanin mass obtained was determined to be 1.1 g, which indicates a final melanin yield of 0.89% obtained from 124 g of invertebrate biomass.

The melanin mass was subjected to fluorimetric measurement and calculations revealed the purity to be 80.72% with respect to synthetic melanin.

Example 5

An experiment was carried out to obtain melanin from a dried prepupae pressed cake from the Black Soldier Fly (*Hermetia illucens*) using the presently disclosed method. The dried prepupae pressed cake was made by passing prepupae from an artificial rearing process through a heated screw press, then drying overnight in a 60° C. oven.

The 150 g of dried prepupae pressed cake was demineralized in 1.5 L of 1 M hydrochloric acid. The mixture was kept on a temperature-controlled hot plate (Witeg MSH-20D, Germany) at 70° C. and stirred with an overhead stirrer (IKA RW20, Germany) at about 200 rpm for 1 hour.

The demineralized first solid fraction was obtained by pouring the mixture repeatedly through a sieve of mesh size 1 mm and washed 7 times with a total of 28 L water, until the pH was between 5 and 7. The wet first solid fraction was dried in an 80° C. oven overnight and weighed. The dry weight of the first solid fraction obtained was determined to be 44.64 g, indicating a weight loss of approximately 70% from the original starting material. 0.89 L of 1 M sodium hydroxide was added to the first solid fraction and the resulting mixture was stirred at 200 rpm, for 3 hours, 50° C.

The second solid fraction was obtained by pouring the mixture repeatedly through a sieve of mesh size 1 mm and washed 7 times with a total of 28 L water, until the second washing liquid was clear, thus ensuring that most of the dissolved proteins had been removed. The wet second solid fraction was dried overnight in an oven at 80° C. The dry weight of the second solid fraction obtained was determined to be 28.06 g which indicates a weight loss of approximately 81% from the original starting material.

Melanin was then liberated from the second solid fraction by adding 0.55 L of 3 M sodium hydroxide to the second solid fraction, and the resulting mixture was stirred at 200 rpm, for 1 hour at 90° C. The melanin-containing supernatant was extracted by filtering the mixture through a sieve of mesh size 1 mm, and then a nylon cloth of standard mesh size 500. 0.25 L water was used to wash the residue and to capture more melanin in the wash liquid, and this solution was similarly filtered to obtain more melanin-containing supernatant.

The melanin-containing supernatant was placed in a beaker and stirred at 200 rpm by a magnetic stirrer (Witeg MSH-20D, Germany). The pH was adjusted to the 0-1 range with 137.5 ml 37% (w/w) HCl to precipitate melanin. The mixture was centrifuged at 3220×g for 5 min in a swinging bucket centrifuge (Eppendorf 5810R, Germany) to pellet the melanin mass.

After centrifugation, the liquid was discarded. The pelleted melanin mass was submerged and mixed in 150 ml water and centrifuged at 4000 rpm for 5 min. The supernatant was decanted, and the pelleted melanin was again mixed with 150 ml water and centrifuged, before it was decanted and dried overnight in an oven at 80° C. The dry weight of the melanin mass obtained was determined to be 0.9693 g, which indicates a final melanin yield of 0.65% obtained from 150 g of invertebrate biomass.

Example 6

An experiment was carried out to obtain melanin from 1.250 g of dried pupae shells of *Hermetia illucens* using an embodiment of the presently disclosed method.

The invertebrate biomass used was dried empty pupae shells from the Black Soldier Fly (*Hermetia illucens*). The dried empty pupae shells were collected from an artificial rearing process and separated from macroscopic contaminants such as plastics, feed, and frass.

1,250 g of dried pupae shells were briefly ground up in a blender (Robot Coupe Blixer 4, France) to ensure rupturing of any un-enclosed pupae and dead adults and sufficient exposure of proteins, fats, and minerals to subsequent process steps.

The 1,250 g of raw material obtained after rupturing of the dried pupae shells was demineralized in batches of 100 g. 1 L of 3 M hydrochloric acid was added to each batch of 100 g ruptured shells. The mixture was kept on a temperature-controlled hot plate (Witeg MSH-20D, Germany) at 50° C. and stirred with an overhead stirrer (IKA RW20, Germany) at about 200 rpm for 2 hours.

The demineralized first solid fraction was obtained by pouring the mixture repeatedly through a sieve and washed with water until the first washing liquid reached a pH of 7 (FIG. 5). The wet first solid fraction (FIG. 6) was dried and weighed. The dry weight of the first solid fraction obtained was determined to be 580 g, indicating a weight loss of approximately 54% from the original starting material. 1 L of 1 M sodium hydroxide was added to each batch of first solid fraction and the resulting mixtures were stirred at 200 rpm, for 1 hour, room temperature (25° C. to 27° C.).

The second solid fraction was obtained by pouring the mixture repeatedly through a sieve and washed with water until the second washing liquid was clear, thus ensuring that most of the proteins had been removed. The wet second solid fraction was dried and weighed. The dry weight of the second solid fraction obtained was determined to be 452 g which indicates a weight loss of approximately 64% from the original starting material.

Melanin was then liberated from the second solid fraction by adding 6 L of 3 M sodium hydroxide to the second solid fraction, and the resulting mixture was stirred at 200 rpm, for 2 hours at 80° C. The melanin-containing supernatant was extracted by draining the mixture through a sieve. 9 L deionized water was used to wash the residue and to capture more melanin in the wash liquid.

The melanin-containing supernatant was placed in beakers and stirred at 200 rpm by a magnetic stirrer (Witeg MSH-20D, Germany). The pH was adjusted to 2 with 36.5% concentrated hydrochloric acid to precipitate melanin. The mixture was centrifuged at 3220×g for 5 min in a swinging bucket centrifuge (Eppendorf 5810R, Germany) to pellet the melanin.

After centrifugation, the liquid was discarded. The pelleted melanin was submerged in 1,500 ml deionized water and centrifuged at 3220×g for 5 min. The supernatant was decanted, and the pelleted melanin was dried overnight in an oven at 60° C. The pelleted melanin was dried, and the dry weight of the melanin obtained was determined to be 52 g, which indicates a final melanin yield of 4.2% obtained from 1,250 g of invertebrate biomass, which is a higher yield percentage than that achieved with prior art solutions Example 7

Fourier Transform Infrared Spectroscopy (FTIR) was carried out to determine the infrared spectrum of melanin obtained from the presently disclosed method and synthetic melanin.

Methods Used in Example 7

Sample 1 (Melanin from prepupae cuticles obtained from the presently disclosed method), Sample 2 (Melanin from pupae shells obtained from the presently disclosed method) and synthetic melanin (Sigma-Aldrich, United States) were obtained in dried powder form. A few grains of each sample were mixed with FTIR-grade potassium bromide (KBr) (Sigma-Aldrich, United States) and ground with an Agate mortar. The powder obtained was pressed into a disc using a manual hydraulic 10 tons benchtop press (Perkin Elmer, United States). Each disc was analysed using an FTIR spectrophotometer (Perkin Elmer Frontier, United States) with the settings 4,000 to 400 $cm^{-1}$ at a scanning rate of 4 $cm^{-1}$. 150 sample scans were used to obtain the spectrum for each sample. The spectra were plotted as transmittance (%) against wavenumber ($cm^{-1}$).

Results Obtained in Example 7

Figure 13:
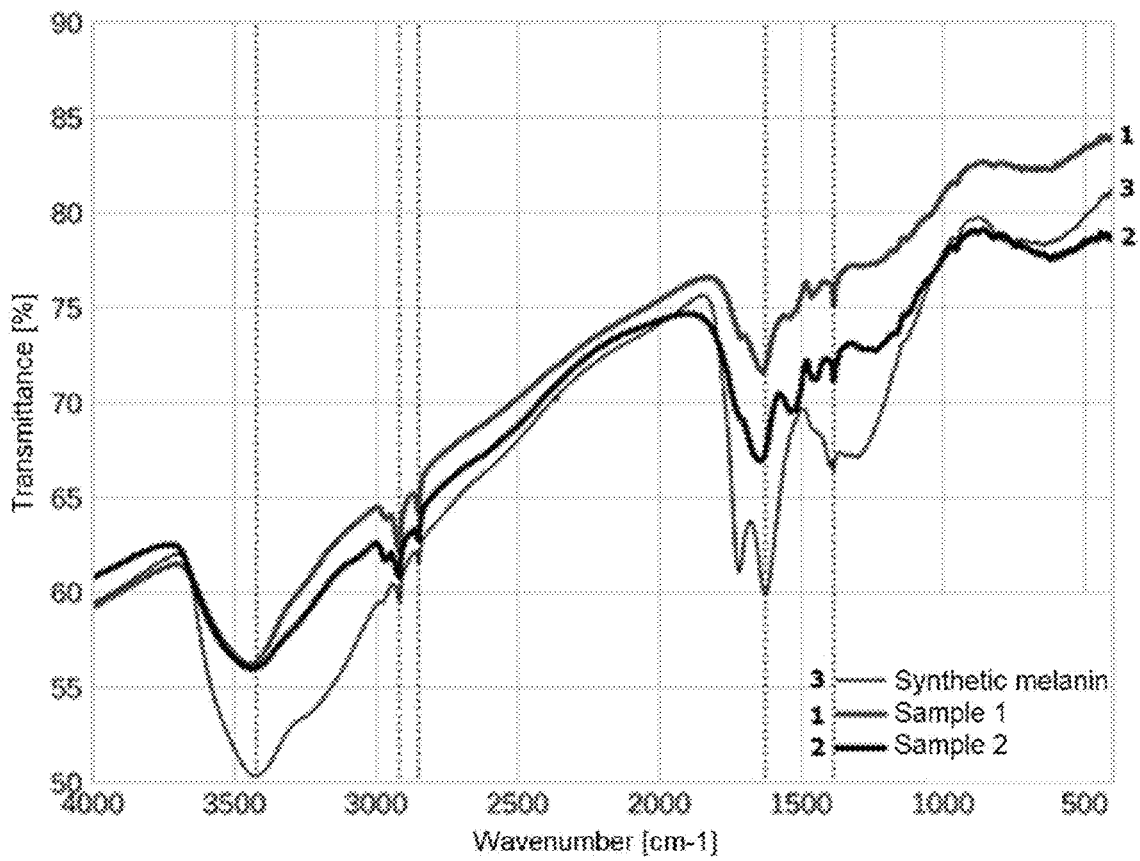
FIG. 13 is a graph showing spectra obtained using Fourier Transform Infrared Spectroscopy (FTIR) (from 400 cm$^{-1}$ to 4,000 cm$^{-1}$) to measure samples of melanin obtained from an embodiment of the presently disclosed method and synthetic melanin, in accordance with embodiments of the present disclosure.

FIG. 13 is a graph showing spectra obtained using Fourier Transform Infrared Spectroscopy (FTIR) (from 400 cm$^{-1}$ to 4,000 cm$^{-1}$) to measure samples of melanin obtained from an embodiment of the presently disclosed method and synthetic melanin, in accordance with embodiments of the present disclosure. FTIR measures the infrared spectrum of a solid, liquid or gas. The spectra of Sample 1 and Sample 2 were found to have high similarities to the synthetic melanin sample and published reference values (FIG. 13) (see Table 1). Reference values were obtained from Mbonyiryivuze et al., Physics and Materials Chemistry, 3(2): 25-29 (2015). Although the spectra obtained for Sample 1 and Sample 2 were found to have similarities to the synthetic melanin sample and reference values, there are markedly different, which indicates that the melanin obtained from the presently disclosed method has chemical and structural differences from synthetic melanin, specifically, there are differences in the ranges of 500 to 1700 cm$^{-1}$.

TABLE 1

FTIR Peak Values from Measurement of Samples in Comparison with Published Reference Peaks for Melanin

| | O—H or N—H stretching vibration modes | Stretching vibration of aliphatic C—H group | Bending vibrations modes of aromatic ring (C=C, C=N) | O—H bending of phenolic and carboxylic groups |
|---|---|---|---|---|
| Reference Wavelength | 3422 | 2917 | 2839 | 1621 | 1374 |
| Synthetic melanin | 3422 | 2918 | 2850 | 1626 | 1384 |
| Sample 1 | 3442 | 2919 | 2851 | 1646 | 1384 |
| Sample 2 | 3433 | 2920 | 2851 | 1636 | 1384 |

Example 8

UV-Vis spectroscopy was carried out to determine the absorption spectrum of melanin obtained from the presently disclosed method and synthetic melanin.

Methods Used in Example 8

Sample 1 (Melanin from prepupae cuticles), Sample 2 (Melanin from pupae shells) and synthetic melanin (Merck/Sigma Melanin, United States) were obtained in dried powder form. A few milligrams of each sample were dissolved in 5 ml 2 M NaOH (NaOH) solution, vigorously mixed and spun down for 10 min to remove any residual, undissolved powder. The blackish liquid free of particles was transferred to a new container and diluted 1:1 with water. A quartz cuvette was thoroughly cleaned with ethanol, dried, and filled with 950 to 980 µl ultrapure water. 20 to 50 µl of Sample 1, Sample 2, and synthetic melanin, were added to each cuvette to a final liquid volume of 100 µl and mixed thoroughly resulting in a very faint aqueous solution. Each solution was measured in a UV-Vis spectrophotometer (Agilent Cary 50, United States) at a maximum wavelength ranging from 190 nm to 1100 nm at a scan rate of 600 nm/min in Dual Beam Mode with baseline correction. For baseline correction, a solution was prepared consisting of 950 µl water and 50 µl 2 M NaOH solution. The absorption was plotted against wavelength in absolute and in semi-logarithmic representation.

Results Obtained in Example 8

Figure 14:
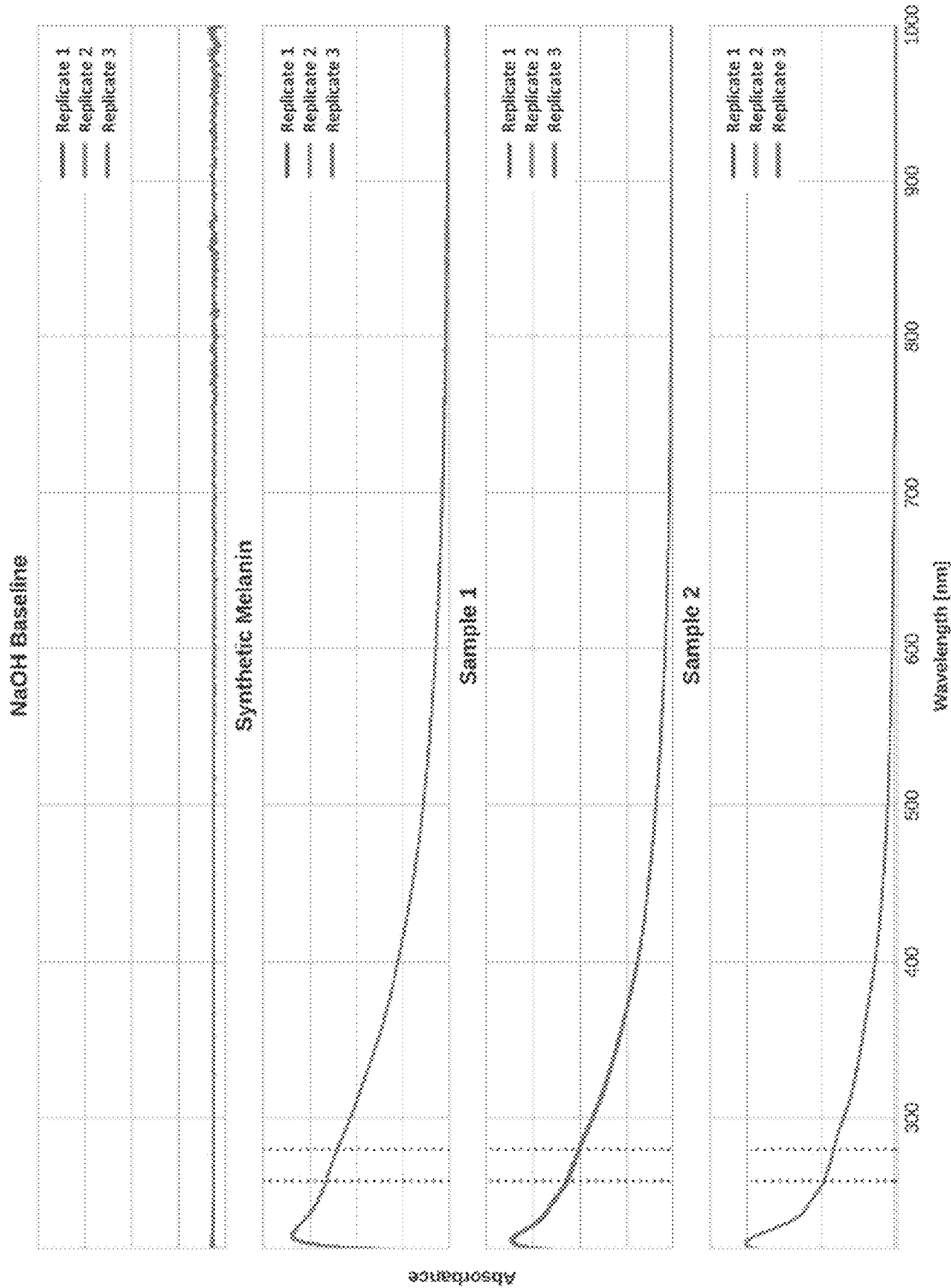
FIG. 14 is a graph showing spectra obtained using UV-Vis spectroscopy to measure samples of melanin obtained from an embodiment of the presently disclosed method and synthetic melanin, in accordance with embodiments of the present disclosure.

FIG. 14 is a graph showing spectra obtained using UV-Vis spectroscopy to measure samples of melanin obtained from an embodiment of the presently disclosed method and synthetic melanin, in accordance with embodiments of the present disclosure. Both samples of melanin obtained from the presently disclosed method and the synthetic melanin exhibited a strong absorbance in the UV range decreasing with longer wavelengths. The absence of pronounced peaks at 260 nm and 280 nm indicated the absence of nucleic acids, lipids, and protein (FIG. 14). The maximum absorbance was measured between 222 nm and 220 nm for Sample 1 and Sample 2 respectively, while the maximum absorbance for synthetic melanin was measured at 225 in (see Table 2). The decrease in the range between 500 nm and 250 nm, yields a negative slope when plotted semi-logarithmically. The values of −0.0041 to −0.0043 obtained from measuring the samples are in line with reference values from literature for melanin from different sources (see Table 2). Although the spectra obtained for Sample 1 and Sample 2 were found to have similarities to the synthetic melanin sample values, there are markedly different, which indicates that the melanin obtained from the presently disclosed method has chemical and structural differences from synthetic melanin, specifically, the melanin obtained from the presently disclosed method is approximately 20% to 30%, as efficient as synthetic melanin in absorbing 500 nm light.

TABLE 2

Derived UV-Vis Values Obtained from Measurement of Samples

| | Maximum Absorption Wavelength [nm] | $R^2$ | Slope of $\log_{10}$ |
|---|---|---|---|
| Sample 1 | 202 | 0.9957-0.9959 | −0.0041 |
| Sample 2 | 220 | 0.998-0.9981 | −0.0042--0.0043 |
| Synthetic melanin | 225 | 0.9842-0.9846 | −0.0042 |

Example 9

Fourier Transform Infrared Spectroscopy-Attenuated total reflectance (FTIR-ATR) was carried out (Bruker Vertex 70 FTIR equipped with a Diamond) to determine the infrared spectrum of melanin obtained from the presently disclosed method. Unlike FTIR which measures the spectrum of the whole sample, FTIR-ATR only measures the spectrum of up to 2 µm of the surface of the sample.

Methods Used in Example 9

A solid sample of melanin obtained from the presently disclosed method was placed onto the sample holder of the FTIR machine and measured. The absorbance spectrum and measured transmittance spectrum were put in scale and presented without units, the absorbance spectrum being a negative logarithmic transformation of the measured transmittance spectrum.

Results Obtained in Example 9

Figure 15:
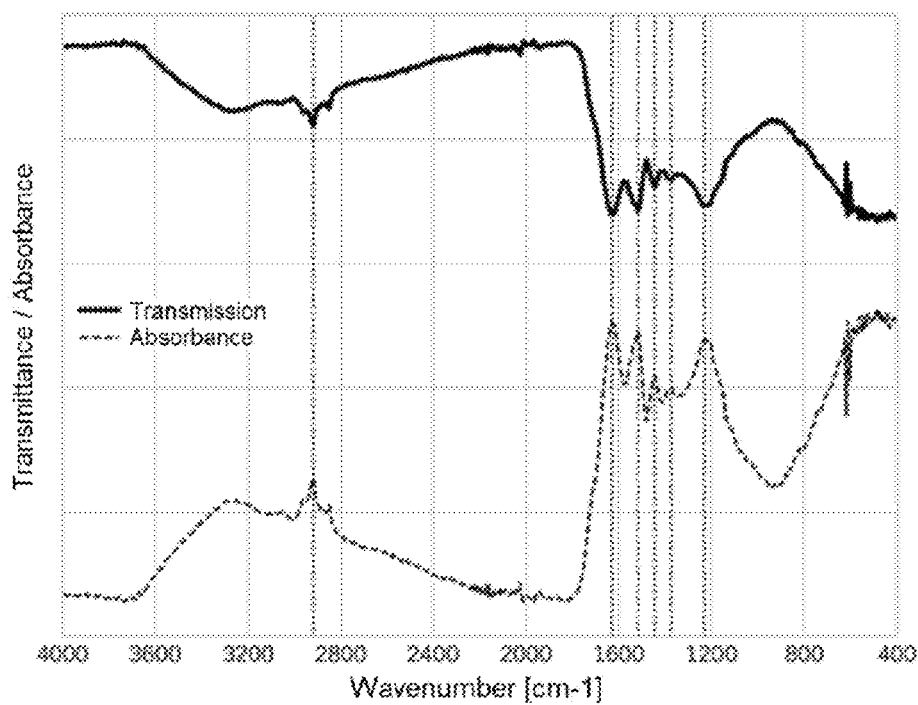
FIG. 15 is a graph showing spectra obtained using Fourier Transform Infrared Spectroscopy-Attenuated Total Reflectance (FTIR-ATR) to measure a sample of melanin obtained from an embodiment of the presently disclosed method, in accordance with embodiments of the present disclosure.

FIG. 15 is a graph showing spectra obtained using Fourier Transform Infrared Spectroscopy-Attenuated Total Reflectance (FTIR-ATR) to measure a sample of melanin obtained from an embodiment of the presently disclosed method, in accordance with embodiments of the present disclosure. As illustrated in FIG. 15, there is a widely unresolved area between 1,750 cm$^{-1}$ to 3,600 cm$^{-1}$ with exemption of a small area around 2,919 cm$^{-1}$. This may be attributed to —OH and —NH groups (3,400 cm$^{-1}$-3,300 cm$^{-1}$), —CH2 and —CH3 groups (aliphatic) and —NH groups (2,960 cm$^{-1}$-2,860 cm$^{-1}$). The aforementioned area is followed an almost hidden peak at around 1,700 cm$^{-1}$ which may represent carbonyl groups (C=O). There is an area of peaks within the range of 1,000 cm$^{-1}$ to 1,700 cm$^{-1}$, and more precisely at 1,230 cm$^{-1}$, 1,373 cm$^{-1}$, 1,445 cm$^{-1}$, 1,516 cm$^{-1}$ and 1,629 cm$^{-1}$. The peaks in this range were found to be similar with values from literature for melanin.

Example 10

Elemental analysis was carried out to determine the elemental composition of macro-elements in melanin obtained from the presently disclosed method.

Methods Used in Example 10

A sample of melanin obtained from the presently disclosed method was dried, ground, and inserted on tin containers into the analyser (FlashSmart CHNS Elemental Analyser, Thermo Scientific). The sample was combusted at high temperature with oxygen to detect carbon (C), nitrogen (N), hydrogen (H) and sulphur (S), the detection carried out by carrying the resulting gases with a helium flow through a gas chromatograph attached to a thermal conductivity detector.

Results Obtained in Example 10

The results obtained are presented below in Table 3. As illustrated in Table 3, the results indicated only the presence of melanin (a polymer of sulphur-free 5,6—Indolequinone monomers) and not phaeomelanin (a polymer of sulphur-containing cysteinyldopa) due to the lack of sulphur detected. Although previous literature indicated that the analysis of pure, unpolymerized 5,6-Indolequinone would result in a CHNS measurement of 65.31% C:3.43% H:9.52% N:0% S, the melanin obtained from the presently disclosed method was not expected to reach such values as the melanin obtained does not consist solely of 5,6-Indolequinones.

TABLE 3

Results from Elemental Analysis

| N (w/w) | C (w/w) | H (w/w) | S w/w) | C/N ratio |
|---|---|---|---|---|
| 10.7% | 52.04% | 5.5% | ND | 4.86 |

Example 11

Inductively coupled plasma—optical emission spectrometry (ICP-OES) was carried out to determine the presence of heavy metals in melanin obtained from the presently disclosed method.

Methods Used in Example 11

A sample of melanin obtained from the presently disclosed method was subject to ashing (i.e., combustion) at 600° C. and digested with a nitric acid (HNO3)-hydrochloric acid (HCL) mixture with a HNO3/HCl ratio of 3:1 in a microwave oven at 240° C. for 15 min. The reaction mixture was then topped up to 10 ml total volume with water. When the resulting mixture was observed to be clear, the mixture was used for analysis with an Inductively Coupled Plasma-Optical Emission Spectrometer (Perkin Elmer Avio 500 ICP-OES). The elements aluminium (Al), arsenic (As), cadmium (Cd), chromium (Cr), copper (Cu), iron (Fe), lead (Pb) and nickel (Ni) were selected for investigation and calibrated accordingly prior.

Results Obtained in Example 11

The results obtained are presented below in Table 4. As illustrated in Table 4, all heavy metals were not detected, except for aluminium, chromium, copper, and iron. The high aluminium level may be traced back to (a) the usage of aluminium foil as a beaker coverage during the extraction procedure and (b) the usage of aluminium trays on which intermediate samples were dried. High levels of aluminium, chromium, copper, and iron may also be attributable to the use of equipment made of stainless-steel in the laboratory. Therefore, the level of such heavy metals should be much lower when scaled up.

TABLE 4

Results from Trace Element Analysis

| Al | As | Cd | Cr | Cu | Fe | Pb | Ni |
|---|---|---|---|---|---|---|---|
| 634 ppm | ND | ND | 7 ppm | 95 ppm | 177 ppm | ND | ND |

Example 12

X-ray Powder Diffraction (XRD) was carried out to measure the diffraction of X-rays caused by crystalline samples of melanin obtained from the presently disclosed method.

Methods Used in Example 12

A dried sample of melanin obtained from the presently disclosed method was ground and put into a sample holder. The sample holder was inserted into the equipment (D8 Advance, Bruker) and the scan preformed at a 2 θ scan angle of 5°-80°. Intensity and its respective angle were recorded to create an X-ray spectrum.

Results Obtained in Example 12

Figure 16:
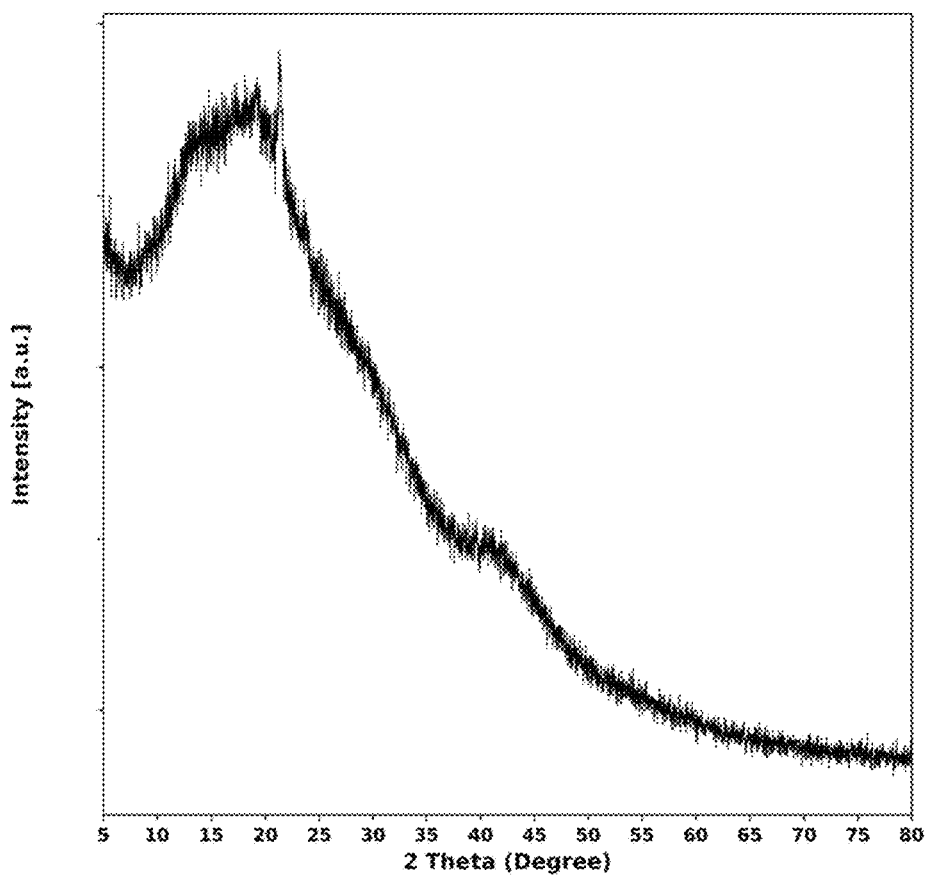
FIG. 16 is a graph showing spectra obtained using X-ray Powder Diffraction (XRD) to measure a sample of melanin obtained from an embodiment of the presently disclosed method, in accordance with embodiments of the present disclosure.

FIG. 16 is a graph showing spectra obtained using X-ray Powder Diffraction (XRD) to measure a sample of melanin obtained from an embodiment of the presently disclosed method, in accordance with embodiments of the present disclosure. As illustrated in FIG. 16, there is a broad diffraction peak which may be attributed to the amorphous nature of melanin. The diffraction pattern obtained was similar to that disclosed in previous literature which confirmed that the melanin obtained was amorphous.

Example 13

Thermogravimetric analysis (TGA) was carried out to measure the thermal stability, decomposition behaviour, water and ash content of melanin obtained from the presently disclosed method.

Methods Used in Example 13

A sample of melanin obtained from the presently disclosed method was dried, ground to 0.5 mm and put into a clean aluminium pan in a sufficient amount to cover the pans bottom. TGA was carried out on a thermogravimetric analyser (Q500, TA instruments/Waters Corporation) with the conditions set as follows: nitrogen gas, balance gas nitrogen at 40.0 ml/min, sample gas nitrogen at 60.0 ml/min, heating in the range from 30-800° C. with 10° C./min heating rate. Time (min), temperature (° C.) and weight (mg) were recorded, and the derivative weight loss (%/0° C.) was calculated. Weight and derivate weight loss were plotted against temperature. Water content was determined by weight loss reached at 130° C. while the start of a decomposition event was determined as the beginning of a slope.

Results Obtained in Example 13

Figure 17:
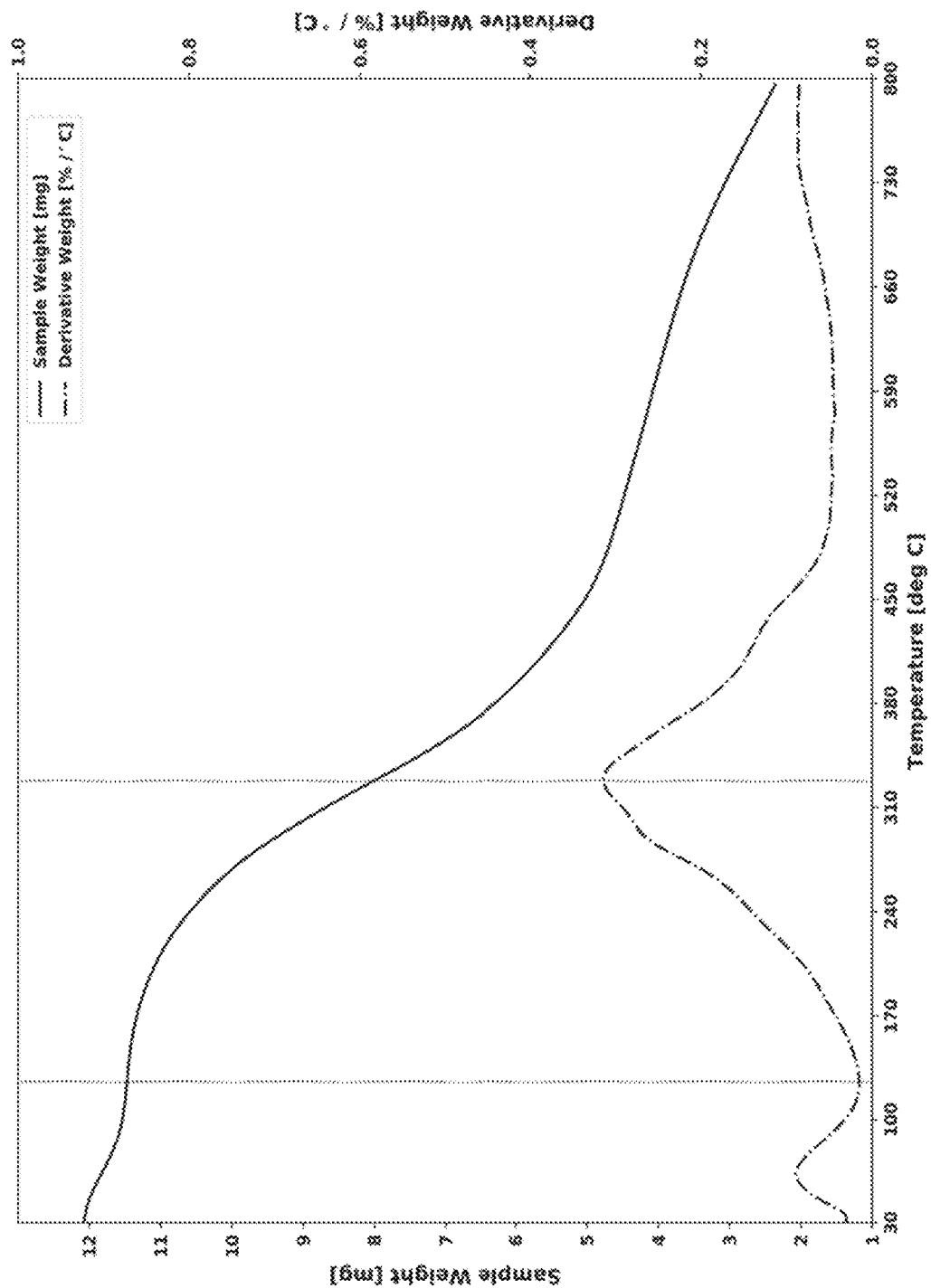
FIG. 17 is a graph showing spectra obtained using thermogravimetric analysis (TGA) to measure a sample of melanin obtained from an embodiment of the presently disclosed method, in accordance with embodiments of the present disclosure.

FIG. 17 is a graph showing spectra obtained using thermogravimetric analysis (TGA) to measure a sample of melanin obtained from an embodiment of the presently disclosed method, in accordance with embodiments of the present disclosure. As illustrated in FIG. 17, there were two clear peaks in the derivate weight curve identified. The first peak at 65° C. determined the water desorption, which was finished at 130° C. The total residual water content was determined to be 5.1%. The second main and much higher peak was found at 328° C. This peak was very broad, spanning 130° C. to around 500° C. and may account for another 40% mass loss or 40% dry mass loss. According to a previous literature on fungal melanin, the decomposition of aliphatic compound happens below 400° C. together with other organic compounds such as protein residues. Aromatic compounds only start to decompose at temperatures above 400° C. Previous literature indicated two peaks for raw extracted, non-purified melanin at 69° C. and 325° C. Although the two peaks for melanin were at similar temperatures (65° C. vs 69° C., and 328° C. vs 325° C.), the 3-4° C. difference in temperature indicates that the melanin obtained from the presently disclosed method has chemical and structural differences from synthetic melanin.

Example 14

Gel Permeation Chromatography (GPC) was carried out on melanin obtained from the presently disclosed method.

Methods Used in Example 14

A sample of melanin obtained from the presently disclosed method was dissolved in Dimethyl sulfoxide (DMSO) at room temperature to obtain a melanin solution. The melanin solution was centrifuged and filtered and 10 μl sample was injected into a GPC system comprising an autosampler unit, a Waters 1525 Binary HPLC Pump and a Waters 2414 Refractive Index (RI) detector employing an Agilent PLgel 5um MIXED-C column. The GPC system was calibrated with Polymethylmethacrylate standards. The GPC run was performed for 15 mins at 35° C. at a flow rate of 1 ml/min and the RI was recorded. For analysis, the signal strength was plotted against run time, the melanin peak was determined and separated in 1% slices, Subsequently, Log Mw was plotted against dwt/d(Log M) and Mp (highest peak), Mn (Number average), Mw (Weight average). Mz (Z average), Mz+1, Mz/Mw, Mz+1/Mw and the polydispersity index d (Mw/Mn) were determined.

Results Obtained in Example 14

Figure 18:
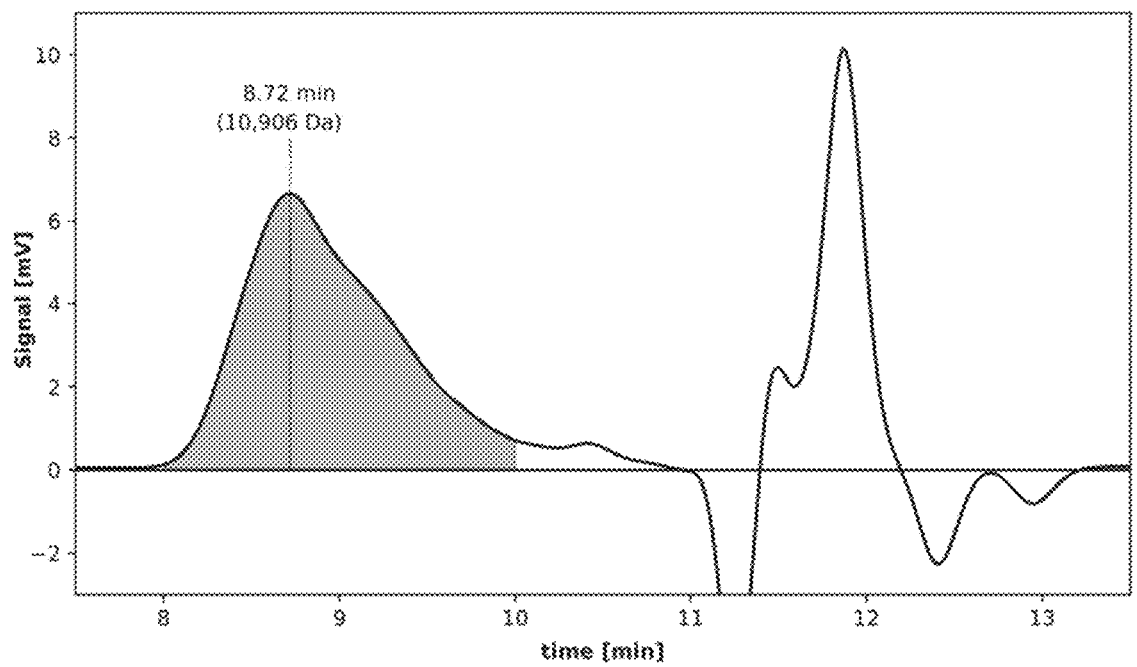
FIG. 18 is a graph showing a Gel Permeation Chromatography (GPC) chromatogram of a sample of melanin obtained from an embodiment of the presently disclosed method, in accordance with embodiments of the present disclosure.

FIG. 18 is a graph showing a Gel Permeation Chromatography (GPC) chromatogram of a sample of melanin obtained from an embodiment of the presently disclosed method, in accordance with embodiments of the present disclosure. As illustrated in FIG. 18, there is a broad peak at 8.72 min (grey area) which corresponds to a molecular weight of 10,906 Da. Dead volume before the peak was not shown, and the peaks following the broad peak at 8.72 min were not involved in the investigation.

Figure 19:
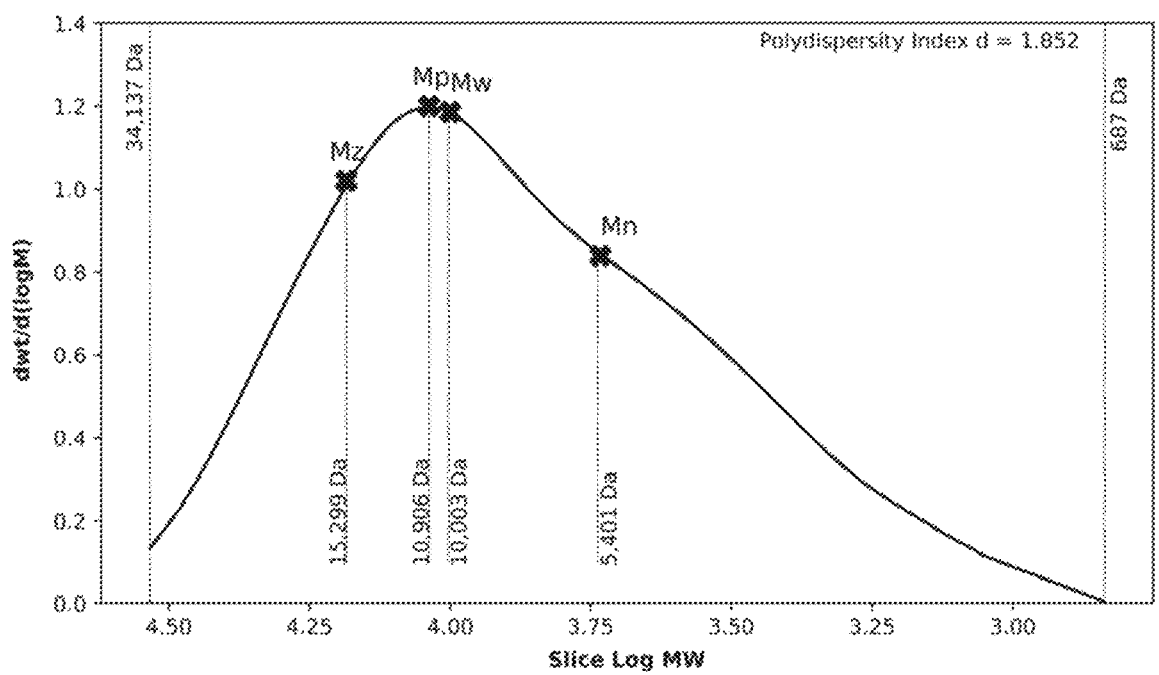
FIG. 19 is a graph showing a distribution of the molecular weight of a sample of melanin obtained from an embodiment of the presently disclosed method, in accordance with embodiments of the present disclosure.

FIG. 19 is a graph showing a distribution of the molecular weight of a sample of melanin obtained from an embodiment of the presently disclosed method, in accordance with embodiments of the present disclosure. The broad peak at 8.72 min identified in FIG. 18 was sliced, and the slice log MW was plotted against dwt/d(log M), with the key GPC values calculated and presented below in Table 4. The polymer size was found to be in the range of 687 Da to 34,137 Da. The number average (Mn), the weight average (Mw), the highest peak (Mp) and the Z average (Mz) were added as point to the plot. The polydispersity index d was determined to be 1.852.

TABLE 5

| Key Characteristics of the Melanin Size Distribution | |
|---|---|
| | Value |
| Mp [Da] | 10,906 |
| Mn [Da] | 5,401 |
| Mw [Da] | 10,003 |
| Mz [Da] | 15,299 |
| Mz + 1 [Da] | 20,232 |
| Mz/Mw | 1.529481 |
| Mz + 1/Mw | 2.022569 |
| Polydispersity Index | 1.852083 |

Example 15

An experiment was carried out to obtain melanin from the adult beetle form of the *Tenebrio molitor*, whose common name is the yellow mealworm.

The invertebrate biomass used was undried pressed cake from the adult form (beetles) of the yellow mealworm (*Tenebrio molitor*). The undried pressed cake was made by passing boiled beetles from an artificial rearing process through a heated screw press.

The 10.93 g of undried pressed cake was demineralised in 0.11 L of 1 M hydrochloric acid. The mixture was kept on a temperature-controlled hot plate (LLG Labware Unistirrer 5, Germany) at 70° C. and stirred with a magnet at about 200 rpm for 1 hour.

The demineralised first solid fraction was obtained by pouring the mixture repeatedly through a sieve of mesh size 1 mm and washed several times with water, until the pH was between 5 and 7. 0.15 L of 1 M sodium hydroxide was added to the wet first solid fraction, and the resulting mixture was stirred at 200 rpm, for 3 hours at 50° C.

The second solid fraction was obtained by pouring the mixture repeatedly through a sieve of mesh size 1 mm and several times with water, until the second washing liquid was clear, thus ensuring that most of the dissolved proteins had been removed. The wet second solid fraction was dried in an 80° C. oven overnight. The dry weight of the second solid fraction obtained was determined to be 1.72 g.

Melanin was then liberated from the second solid fraction by adding 0.15 L of 3 M sodium hydroxide to the second solid fraction, and the resulting mixture was stirred at 200 rpm, for 1 hour at 90° C. The melanin-containing supernatant was extracted by filtering the mixture through a sieve of mesh size 1 mm, and then a nylon cloth of standard mesh size 500. 0.1 L water was used to wash the residue and to capture more melanin in the wash liquid, and this solution was similarly filtered to obtain more melanin-containing supernatant.

The melanin-containing supernatant was placed in a beaker and stirred at 200 rpm by a magnetic stirrer (Witeg MSH-20D, Germany). The pH was adjusted to the 0 to 1 range with 45 ml 37% (w/w) HCl to precipitate melanin. The mixture was centrifuged at 3220×g for 5 min in a swinging bucket centrifuge (Eppendorf 5810R. Germany) to pellet the melanin mass.

After centrifugation, the liquid was discarded. The pelleted melanin mass was submerged and mixed in 45 ml water and centrifuged at 3220×g for 5 min. The supernatant was decanted, and the pelleted melanin was again mixed with 45 ml water and centrifuged, before it was decanted and dried overnight in an oven at 80° C. The dry weight of the melanin mass obtained was determined to be 0.023 g.

The processes described above provides effective separation of proteins, minerals and chitin from melanin which results in sufficiently pure melanin. Furthermore, the processes described above are a cost-effective method of producing melanin. The processes described above do not incur the hefty costs associated with synthesizing melanin in the lab or growing fungi for the extraction of melanin as the invertebrate biomass used is derived from secondary by-products of the insect farming industry and thus can be cheaply obtained.

The invention claimed is:

1. A method of obtaining melanin from a melanised invertebrate biomass, the method comprising:
   (i) rupturing the melanised invertebrate biomass to form a raw material;
   (ii) demineralizing the raw material with an acidic solution to form a first solid fraction;
   (iii) deproteinating the first solid fraction with a first sodium hydroxide solution having a concentration of between 0.5 M and 3 M to form a second solid fraction;
   (iv) liberating the melanin from the second solid fraction with a second sodium hydroxide solution having a concentration of between 1 M and 6 M resulting in a supernatant comprising the melanin;
   (v) extracting the supernatant; and
   (vi) precipitating the melanin from the supernatant with hydrochloric acid.

2. The method of claim 1, wherein the melanised invertebrate biomass is a melanised Arthropoda phylum species.

3. The method of claim 1, wherein the melanised invertebrate biomass is *Hermetia illucens* or is an adult form of *Tenebrio molitor*.

4. The method of claim 1, wherein the melanised invertebrate biomass comprises cuticles from prepupal stages, empty pupae shells or spent adult stage.

5. The method of claim 1, wherein the acidic solution is hydrochloric acid having a concentration of between 0.1 M and 3 M; or the acidic solution is lactic acid having a concentration of between 1% and 10% w/w.

6. The method of claim 1, wherein the demineralizing in step (ii) comprises adding the acidic solution to the raw material to obtain a first mixture having a first solid-to-liquid ratio of between 1:10 and 1:100.

7. The method of claim 6, further comprising treating the first mixture for a first period of time at a first temperature of between 25-° C. and 90-° C.; and extracting the first solid fraction from the first mixture by filtration or centrifugation.

8. The method of claim 7, wherein the first period of time is between 1 hour and 24 hours.

9. The method of claim 7, farther comprising washing the first solid fraction with water and receiving a first washing liquid, checking the first washing liquid for pH level, and rewashing the first solid fraction with water until the first washing liquid pH level is between 5 and 7.

10. The method of claim 1, wherein the deproteinating in step (iii) comprises adding the first sodium hydroxide solution to the first solid fraction to obtain a second mixture, said second mixture has a second solid-to-liquid ratio of between 1:10 and 1:30.

11. The method of claim 10, further comprising treating the second mixture for a second period of time at a second temperature between 25-° C. and 90-° C., the second period of time is between 30 minutes and 5 hours; and extracting the second solid fraction from the second mixture by filtration or centrifugation.

12. The method of claim 11, further comprising the step of washing the second solid fraction with water and receiving a second washing liquid, checking the second washing liquid for pH level, and rewashing the second solid fraction with water until the second washing liquid pH level is between 7 to 9.

13. The method of claim 1, wherein liberating the melanin in step (iv) comprises:
   (iv-a) adding the second sodium hydroxide solution to the second solid fraction to obtain a third mixture; and
   (iv-b) treating the third mixture for a third period of time at a third temperature of between 70-° C. and 90-° C.

14. The method of claim 13, wherein adding the second sodium hydroxide solution is performed to obtain a third solid-to-liquid ratio of between 1:10 and 1:24.

15. The method of claim 13, wherein the third period of time is between 1 hour and 6 hours.

16. A melanin obtainable by a method according to claim 1.

17. A purified melanin obtainable by a process comprising the steps of:
   (a) providing a melanised invertebrate biomass;
   (b) rupturing the melanised invertebrate biomass to form a raw material;
   (c) demineralizing the raw material with an acidic solution to form a first solid fraction;
   (d) deproteinating the first solid fraction with a first sodium hydroxide solution having a concentration of between 0.5 M and 3 M to form a second solid fraction;
   (e) liberating melanin from the second solid fraction with a second sodium hydroxide solution having a concentration of between 1 M and 6 M resulting in a supernatant comprising the melanin;
   (f) extracting the supernatant; and
   (g) precipitating the melanin from the supernatant with hydrochloric acid.

18. The purified melanin of claim 17, wherein the melanised invertebrate biomass is a melanised Arthropoda phylum species.

19. The purified melanin of claim 17, wherein the melanised invertebrate biomass is *Hermetica illucens* or is an adult form of *Tenebrio Molitor*.

20. The purified melanin of claim 17, wherein the melanised invertebrate biomass comprises cuticles from prepupal stages, empty pupae shells or spent adult stage.

\* \* \* \* \*